(12) United States Patent
Wang et al.

(10) Patent No.: US 11,436,739 B2
(45) Date of Patent: Sep. 6, 2022

(54) METHOD, APPARATUS, AND STORAGE MEDIUM FOR PROCESSING VIDEO IMAGE

(71) Applicant: TENCENT TECHNOLOGY (SHENZHEN) COMPANY LIMITED, Shenzhen (CN)

(72) Inventors: Yabiao Wang, Shenzhen (CN); Yanhao Ge, Shenzhen (CN); Zhenye Gan, Shenzhen (CN); Yuan Huang, Shenzhen (CN); Changyou Deng, Shenzhen (CN); Yafeng Zhao, Shenzhen (CN); Feiyue Huang, Shenzhen (CN); Yongjian Wu, Shenzhen (CN); Xiaoming Huang, Shenzhen (CN); Xiaolong Liang, Shenzhen (CN); Chengjie Wang, Shenzhen (CN); Jilin Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 150 days.

(21) Appl. No.: 16/922,196

(22) Filed: Jul. 7, 2020

(65) Prior Publication Data
US 2020/0334830 A1    Oct. 22, 2020

Related U.S. Application Data

(63) Continuation of application No. PCT/CN2019/085604, filed on May 6, 2019.

(30) Foreign Application Priority Data

Jun. 20, 2018    (CN) .......................... 201810639495.0

(51) Int. Cl.
*G06T 7/20*    (2017.01)
*G06N 3/04*    (2006.01)
(Continued)

(52) U.S. Cl.
CPC ............. *G06T 7/20* (2013.01); *G06N 3/0454* (2013.01); *G06N 3/08* (2013.01); *G06T 5/30* (2013.01);
(Continued)

(58) Field of Classification Search
CPC combination set(s) only.
See application file for complete search history.

(56) References Cited

U.S. PATENT DOCUMENTS 9,760,806 B1 *   9/2017  Ning ....................... G06T 7/277
2011/0229052 A1  9/2011  Li et al.
(Continued)

FOREIGN PATENT DOCUMENTS

CN    106296728 A    1/2017
CN    106875415 A    6/2017
(Continued)

OTHER PUBLICATIONS

Lituan Wang , "Trajectory Predictor by Using Recurrent Neural Networks in Visual Tracking ," May 30, 2017,IEEE Transactions on Cybernetics, vol. 47, No. 10, Oct. 2017, pp. 3172-3176.*
(Continued)

*Primary Examiner* — Omar S Ismail
(74) *Attorney, Agent, or Firm* — Crowell & Moring LLP

(57) ABSTRACT

This present disclosure describes a video image processing method and apparatus, a computer-readable medium and an electronic device, relating to the field of image processing technologies. The method includes determining, by a device, a target-object region in a current frame in a video. The device includes a memory storing instructions and a pro-
(Continued)

cessor in communication with the memory. The method also includes determining, by the device, a target-object tracking image in a next frame and corresponding to the target-object region; and sequentially performing, by the device, a plurality of sets of convolution processing on the target-object tracking image to determine a target-object region in the next frame. A quantity of convolutions of a first set of convolution processing in the plurality of sets of convolution processing is less than a quantity of convolutions of any other set of convolution processing.

17 Claims, 17 Drawing Sheets

(51) Int. Cl.
*G06N 3/08* (2006.01)
*G06T 5/30* (2006.01)
*G06T 7/00* (2017.01)

(52) U.S. Cl.
CPC .. *G06T 7/0002* (2013.01); *G06T 2207/10016* (2013.01); *G06T 2207/20081* (2013.01); *G06T 2207/20084* (2013.01)

(56) References Cited

U.S. PATENT DOCUMENTS

| | | | | |
|---|---|---|---|---|
| 2015/0117540 | A1* | 4/2015 | Morimoto | H04N 19/543 375/240.16 |
| 2016/0259980 | A1* | 9/2016 | Mlybari | G06T 7/277 |
| 2016/0260226 | A1* | 9/2016 | Yano | G06V 20/52 |
| 2018/0300553 | A1* | 10/2018 | Khosla | G06K 9/6271 |
| 2018/0307912 | A1* | 10/2018 | Selinger | G06K 9/6256 |
| 2018/0341872 | A1* | 11/2018 | Wang | G06V 10/82 |
| 2019/0156123 | A1* | 5/2019 | Chiang | G06V 10/50 |
| 2019/0304105 | A1* | 10/2019 | Gao | G06K 9/6256 |
| 2019/0311202 | A1* | 10/2019 | Lee | G06K 9/627 |

FOREIGN PATENT DOCUMENTS

| | | | |
|---|---|---|---|
| CN | 107492115 A | 12/2017 | |
| CN | 107871105 A | 4/2018 | |
| CN | 108898086 A | 11/2018 | |
| CN | 108960090 A | 12/2018 | |
| WO | WO-2019149071 A1 * | 8/2019 | ......... G06K 9/00362 |

OTHER PUBLICATIONS

Weili Fang,"Automated detection of workers and heavy equipment on construction sites: A convolutional neural network approach," May 16, 2018,Advanced Engineering Informatics 37 (2018), pp. 139-147.*

Wenming Cao,"Fast Deep Neural Networks With Knowledge Guided Training and Predicted Regions of Interests for Real-Time Video Object Detection," Jan. 24 2018, IEEE Access ( vol. 6),Sequential Data Modeling and Its Emerging Applications, pp. 8990-8997.*

Yang Yang,"Semi-supervised Learning of Feature Hierarchies for Object Detection in a Video," Jun. 2013, Proceedings of the IEEE Conference on Computer Vision and Pattern Recognition (CVPR), pp. 1650-1654.*

Han Zhang,"Visual tracking using Siamese convolutional neural network with region proposal and domain specific updating," Nov. 29, 2017,Neurocomputing 275 (2018),pp. 2645-2651.*

International Search Report and Written Opinion regarding Appl. No. PCT/CN2019/085604 dated Aug. 12, 2019, 10 pages.

Chinese Office Action with English concise explanation of relevance regarding 201810639495.0 dated Jul. 18, 2022.

Ting et al., "Lightweight Convolutional Neural Network Architecture for Mobile Platforms," with English abstract on first page, Shanghai Advanced Research Institute, Feb. 5, 2018, Beijing, 9 pages.

Penguin—Xiao Feng's learning experience, "Deep dive into the AlexNet network," with English concise abstract, dated Jun. 2, 2018, 3 pages.

* cited by examiner and STORAGE
METHOD, APPARATUS, AND STORAGE MEDIUM FOR PROCESSING VIDEO IMAGE

RELATED APPLICATION

This application is a continuation application of PCT Patent Application No. PCT/CN2019/085604, filed on May 6, 2019, which claims priority to Chinese Patent Application No. 201810639495.0, filed with the Chinese Patent Office on Jun. 20, 2018, both of which are incorporated herein by reference in their entireties.

FIELD OF THE TECHNOLOGY

This application relates to the field of image processing technologies, and in particular, to a video image processing method, a video image processing apparatus, a computer-readable medium and an electronic device.

BACKGROUND OF THE DISCLOSURE

With the development of image processing technologies, detection, tracking, or recognition of various objects in a video image has been widely used in various fields such as human-computer interaction, intelligent monitoring, security check, data entertainment, digital cameras, or the like. For example, face recognition technologies can be used for beautifying a face recognized in a video.

The information disclosed in the above background part is only used for enhancing the understanding of the background of this application. Therefore, information that does not constitute the related art known to a person of ordinary skill in the art may be included.

SUMMARY

Embodiments of this application provide a video image processing method, performed by an electronic device, the method including: determining a target object position region in a current frame image in a video; determining a target object tracking image that is in a next frame image and that corresponds to the target object position region; and sequentially performing a plurality of sets of convolution processing on the target object tracking image to determine a target object position region in the next frame image, a quantity of convolutions of a first set of convolution processing in the plurality of sets of convolution processing being less than a quantity of convolutions of any other set of convolution processing.

The present disclosure describes a method for processing images in a video. The method includes determining, by a device, a target-object region in a current frame in a video. The device includes a memory storing instructions and a processor in communication with the memory. The method also includes determining, by the device, a target-object tracking image in a next frame and corresponding to the target-object region; and sequentially performing, by the device, a plurality of sets of convolution processing on the target-object tracking image to determine a target-object region in the next frame, a quantity of convolutions of a first set of convolution processing in the plurality of sets of convolution processing being less than a quantity of convolutions of any other set of convolution processing.

The present disclosure describes an apparatus for processing images in a video. The apparatus includes a memory storing instructions; and a processor in communication with the memory. When the processor executes the instructions, the processor is configured to cause the apparatus to determine a target-object region in a current frame in a video, determining a target-object tracking image in a next frame and corresponding to the target-object region, and sequentially perform a plurality of sets of convolution processing on the target-object tracking image to determine a target-object region in the next frame, a quantity of convolutions of a first set of convolution processing in the plurality of sets of convolution processing being less than a quantity of convolutions of any other set of convolution processing.

The present disclosure describes a non-transitory computer readable storage medium storing computer readable instructions. The computer readable instructions, when executed by a processor, are configured to cause the processor to perform determining a target-object region in a current frame in a video; determining a target-object tracking image in a next frame and corresponding to the target-object region; and sequentially performing a plurality of sets of convolution processing on the target-object tracking image to determine a target-object region in the next frame, a quantity of convolutions of a first set of convolution processing in the plurality of sets of convolution processing being less than a quantity of convolutions of any other set of convolution processing.

The embodiments of this application further provide a video image processing apparatus, including a position determining module, a tracking image obtaining module and a next-position determining module.

Specifically, the position determining module may be configured to determine a target object position region in a current frame image in a video; the tracking image obtaining module may be configured to sequentially perform a plurality of sets of convolution processing on a target object tracking image to determine a target object position region in a next frame image; the next-position determining module may be configured to sequentially perform a plurality of sets of convolution processing on a target object tracking image to determine a target object position region in a next frame image, a quantity of convolutions of a first set of convolution processing in the plurality of sets of convolution processing is less than a quantity of convolutions of any other set of convolution processing.

The embodiments of this application further provide a computer-readable medium storing a computer program, the program, when executed by a processor, implementing the video image processing method described above.

The embodiments of this application further provide an electronic device, including one or more processors; and a storage apparatus, configured to store one or more programs, the one or more programs, when executed by the one or more processors, causing the one or more processors to implement the video image processing method described above.

It is to be understood that the above general description and the following detailed description are only exemplary and explanatory, and cannot limit this application.

BRIEF DESCRIPTION OF THE DRAWINGS

The accompanying drawings herein are incorporated into and constitute a part of this specification, show embodiments consistent with this application, and are used with the specification to explain the principles of this application. Obviously, the accompanying drawings in the following descriptions are merely some embodiments of this application, and a person of ordinary skill in the art may further obtain other accompanying drawings according to the accompanying drawings without creative efforts. In the accompanying drawings.

DESCRIPTION OF EMBODIMENTS

Figure 1:
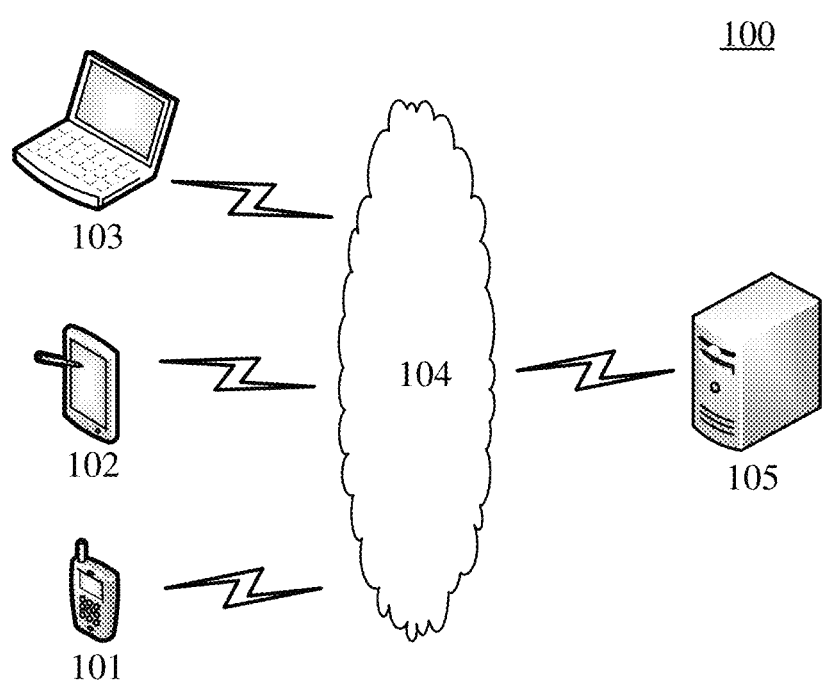
FIG. 1 is a schematic diagram of an exemplary system architecture to which an image processing method or an image processing apparatus according to an embodiment of this application may be applied.

Exemplary implementations are now described more comprehensively with reference to the accompanying drawings. However, the exemplary implementations may be implemented in a plurality of forms, and are not limited to the examples described herein. On the contrary, such implementations are provided to make this application more comprehensive and complete, and fully convey the concepts of the exemplary implementations to a person skilled in the art. The described features, structures, or characteristics may be combined in one or more implementations in any suitable manner. In the following description, many specific details are provided to give a full understanding of the implementations of this application. However, it is to be appreciated by a person skilled in the art that one or more of the specific details may be omitted during practice of the technical solutions of this application, or other methods, components, apparatus, steps, or the like may be used. In other cases, well-known technical solutions are not shown or described in detail in order to avoid overwhelming the subject and thus obscuring various aspects of this application.

The terms "include", "contain" and any other variants thereof in the specification, claims, and accompanying drawings of this application are intended to cover a non-exclusive inclusion, so that a process, a method, a system, a product, or a device that includes a series of units is not necessarily limited to those units, but may include other units not expressly listed or inherent to such a process, method, product, or device.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

In addition, the accompanying drawings are only schematic illustrations of this application and are not necessarily drawn to scale. The same reference numbers in the drawings represent the same or similar parts, and therefore, repeated descriptions thereof are omitted. Some of the block diagrams shown in the accompanying drawings are functional entities and do not necessarily correspond to physically or logically independent entities. Such functional entities may be implemented by using software, or implemented in one or more hardware modules or integrated circuits, or implemented in different networks and/or processor apparatuses and/or micro-controller apparatuses.

The flowcharts shown in the accompanying drawings are merely exemplary descriptions and do not necessarily include all steps. For example, some steps may further be decomposed, and some steps may be merged or partially merged. As a result, an actual execution order may be changed according to an actual situation.

In video image processing technologies, for example, gesture recognition in a video stream, in some embodiments, gesture recognition is implemented by using a gesture segmentation technology. In such a method, gesture segmentation is required in each frame. It is difficult to achieve good real-time performance, and the effect is poor. In some embodiments, a gesture in a video may be determined by using a technology that combines skin color detection with gesture recognition. In such a solution, because a skin color model is easily interfered by light, false detection of gestures occurs easily.

In addition, a model used in video image processing in the foregoing embodiment is large and has a low calculation speed.

For the foregoing technical problems, embodiments of this application provide a video image processing method and apparatus, a computer-readable medium and an electronic device.

FIG. 1 is a schematic diagram of an exemplary system architecture to which a video image processing method or a video image processing apparatus according to an embodiment of this application may be applied.

As shown in FIG. 1, a system architecture 100 may include one or more of terminal devices 101, 102, and 103, a network 104, and a server 105. The network 104 is configured to provide a medium of a communication link between the terminal device 101, 102, 103 and the server 105. The network 104 may include various connection types, such as a wired or wireless communication link, or a fiber optic cable.

It is to be understood that the quantities of terminal devices, networks, and servers in FIG. 1 are only schematic. There may be any quantities of terminal devices, networks and servers according to an actual requirement. For example, the server 105 may be a server cluster including a plurality of servers.

A user may use the terminal device 101, 102, 103 to interact with the server 105 via the network 104 to receive or send a message or the like. The terminal device 101, 102, 103 may be various electronic devices having display screens, including but not limited to a smart phone, a tablet computer, a portable computer, a desktop computer, or the like.

The server 105 may be a server providing various services. For example, the server 105 may obtain a video uploaded by the terminal device 101, 102, 103, and determine a target object position region in a current frame image in the video; determine a target object tracking image that is in a next frame image and that corresponds to the target object position region; sequentially perform a plurality of sets of convolution processing on the target object tracking image to determine a target object position region in the next frame image, a quantity of convolutions of a first set of convolution processing in the plurality of sets of convolution processing being less than a quantity of convolutions of any other set of convolution processing.

The determining a target object position region in a current frame image may include inputting a feature map of the current frame image into a basic neural network for processing. Specifically, the basic neural network may include a plurality of stacked convolution processing modules, and that each convolution processing module processes the inputted feature map includes: performing 1×1 dimensionality reduction convolution processing on the inputted feature map to obtain a first feature map; performing 1×1 dilated convolution processing on the first feature map to obtain a second feature map; performing depthwise separable convolution processing on the first feature map to obtain a third feature map; and splicing the second feature map and the third feature map to obtain a feature map outputted by the convolution processing module.

The performing depthwise separable convolution processing on the first feature map to obtain a third feature map may include: performing 3×3 convolution processing on each dimension of the first feature map respectively to obtain an intermediate feature map having the same dimensionality as the first feature map; and performing 1×1 convolution processing on the intermediate feature map to obtain the third feature map.

In addition, the server 105 may recognize a target object in the target object position region in the next frame image to determine a category of the target object.

The foregoing description is a process in which the server 105 specifically performs the video image processing method of this application. In this case, a video image processing apparatus is generally disposed in the server 105.

However, it is to be understood that because the video image processing method described in this application has characteristics such as using a small model or having a fast processing speed, the video image processing method provided by other embodiments of this application may further be directly performed by the terminal device 101, 102, 103 without causing the terminal device to consume a large quantity of system resources. That is, the terminal device 101, 102, 103 may process a video image by directly using a method described below to detect and track a target object in the video. In such a case, this application may not rely on a server. Correspondingly, the video image processing apparatus may also be disposed in the terminal device 101, 102, 103.

Figure 2:
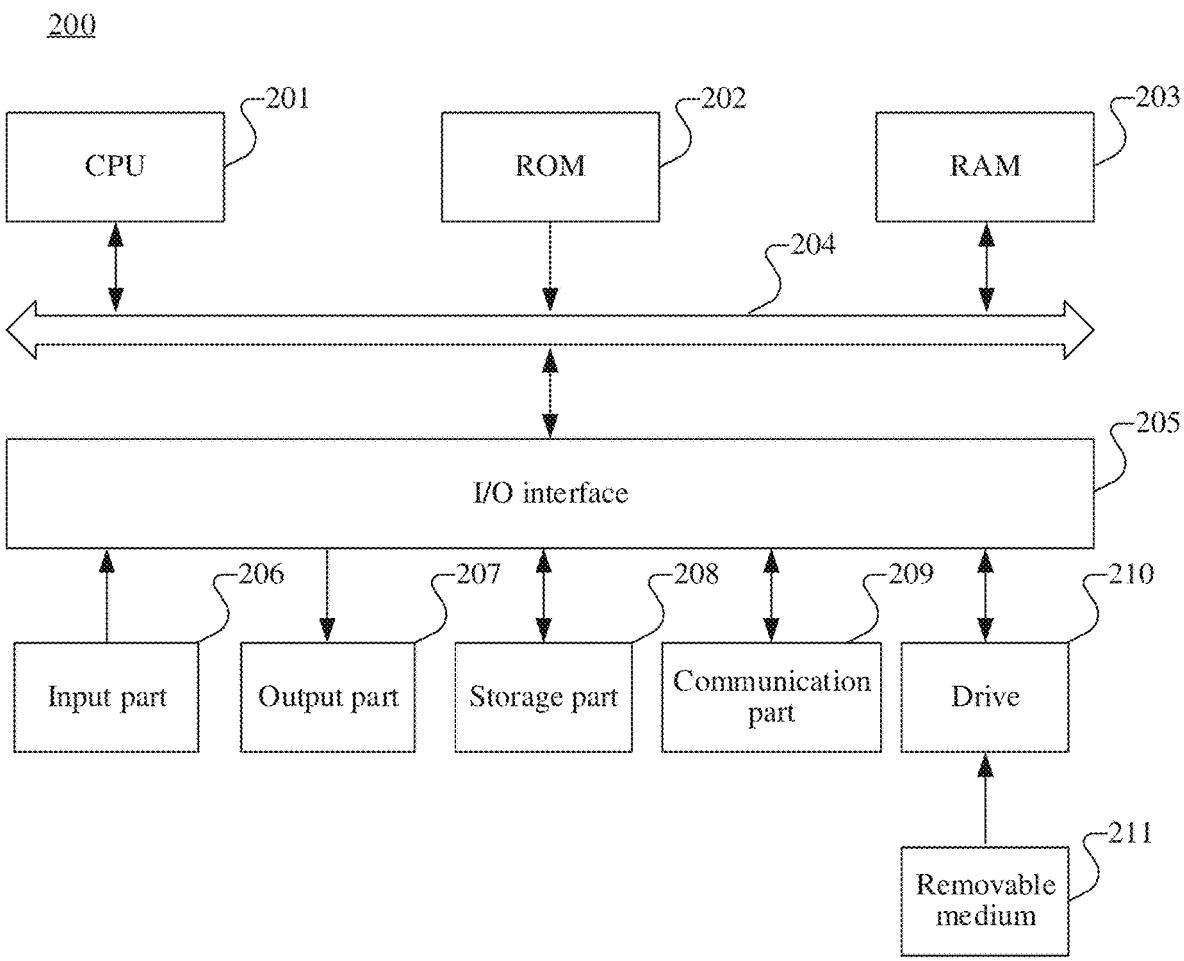
FIG. 2 is a schematic structural diagram of a computer system suitable for implementing an electronic device according to an embodiment of this application.

FIG. 2 is a schematic structural diagram of a computer system suitable for implementing an electronic device according to an embodiment of this application.

A computer system 200 of the electronic device shown in FIG. 2 is only an example, and does not limit any function and usage scope of the embodiments of this application.

As shown in FIG. 2, the computer system 200 includes a central processing unit (CPU) 201. The CPU 201 can perform various appropriate actions and processing according to a program stored in a read-only memory (ROM) 202 or a program loaded into a random access memory (RAM) 203 from a storage part 208. In the RAM 203, various programs and data necessary for system operations are further stored. The CPU 201, the ROM 202, and the RAM 203 are connected to each other by using a bus 204. An input/output (I/O) interface 205 is further connected to the bus 204.

Components connected to the I/O interface 205 are as the following: an input part 206 including a keyboard, a mouse or the like; an output part 207 including a cathode ray tube (CRT), a liquid crystal display (LCD), a speaker or the like; a storage part 208 including a hard disk or the like; and a communication part 209 of a network interface card, including a LAN card, a modem or the like. The communication part 209 performs communication processing through a network such as the Internet. A drive 210 is further connected to the I/O interface 205 as needed. A removable medium 211, such as a magnetic disk, an optical disk, a magneto-optical disk, a semiconductor memory or the like, is installed on the drive 210 as needed, so that a computer program read therefrom is installed into the storage part 208 as needed.

In particular, a process described below with reference to a flowchart may be implemented as a computer software program according to an embodiment of this application. For example, an embodiment of this application includes a computer program product. The computer program product includes a computer program stored in a computer-readable medium. The computer program includes program code used for performing a method shown in the flowchart. In such an embodiment, by using the communication part 209, the computer program may be downloaded and installed on a network, and/or installed from the removable medium 211. When the computer program is executed by the central processing unit (CPU) 201, various functions defined in a system of this application are executed.

The computer-readable medium shown in this application may be a computer-readable signal medium or a computer-readable storage medium or any combination of the two. The computer-readable storage medium may be, for example, but not limited to, an electrical, magnetic, optical, electromagnetic, infrared, or semiconductor system, apparatus, or device, or any combination thereof. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier, the data signal carrying computer-readable program code. Such a propagated data signal may be in a plurality of forms, including but not limited to an electromagnetic signal, an optical signal, or any suitable combination thereof. The computer-readable signal medium may further be any computer-readable medium in addition to a computer-readable storage medium. The computer-readable medium may send, propagate, or transmit a program that is used by or used in conjunction with an instruction execution system, an apparatus, or a device. The program code contained in the computer-readable medium may be transmitted by using any appropriate medium, including but not limited to: a wireless medium, a wire, an optical cable, RF, any suitable combination thereof, or the like.

The flowcharts and block diagrams in the accompanying drawings illustrate possible system architectures, functions and operations that may be implemented by a system, a method, and a computer program product according to various embodiments of this application. At this point, each block in the flowchart or the block diagram may represent a module, a program segment, or a part of code. The module, the program segment, or the part of code contains one or more executable instructions used for implementing specified logic functions. In some alternative implementations, the functions indicated in the blocks may occur in an order different from an order indicated in the accompanying drawings. For example, two blocks represented in succession may be basically executed in parallel, and sometimes may be executed in a reverse order. This depends on related functions. Each block in the block diagram or the flowchart, and a combination of blocks in the block diagram or the flowchart, may be implemented by using a specific hardware-based system that performs specified functions or operations, or may be implemented by using a combination of special-purpose hardware and computer instructions.

The unit described in the embodiments of this application may be implemented by using software or hardware, and the described unit may alternatively be disposed in a processor. Names of the units do not constitute a limitation on the units under certain circumstances.

In some embodiments, this application further provides a computer-readable medium. The computer-readable medium may be contained in the electronic device described in the foregoing embodiment, or may exist alone without being assembled into the electronic device. The foregoing computer-readable medium carries one or more programs. When executed by the electronic device, the one or more programs cause the electronic device to implement the method described in the following embodiment.

A video image processing solution described below may be adapted to product requirements of the mobile Internet. Specifically, the video image processing solution may be applied to face recognition of cameras, human body detection in a selfie, detection of a body feature (for example, a gesture) in an interesting short video, and vehicle detection in vehicle recognition through photographing.

Figure 3:
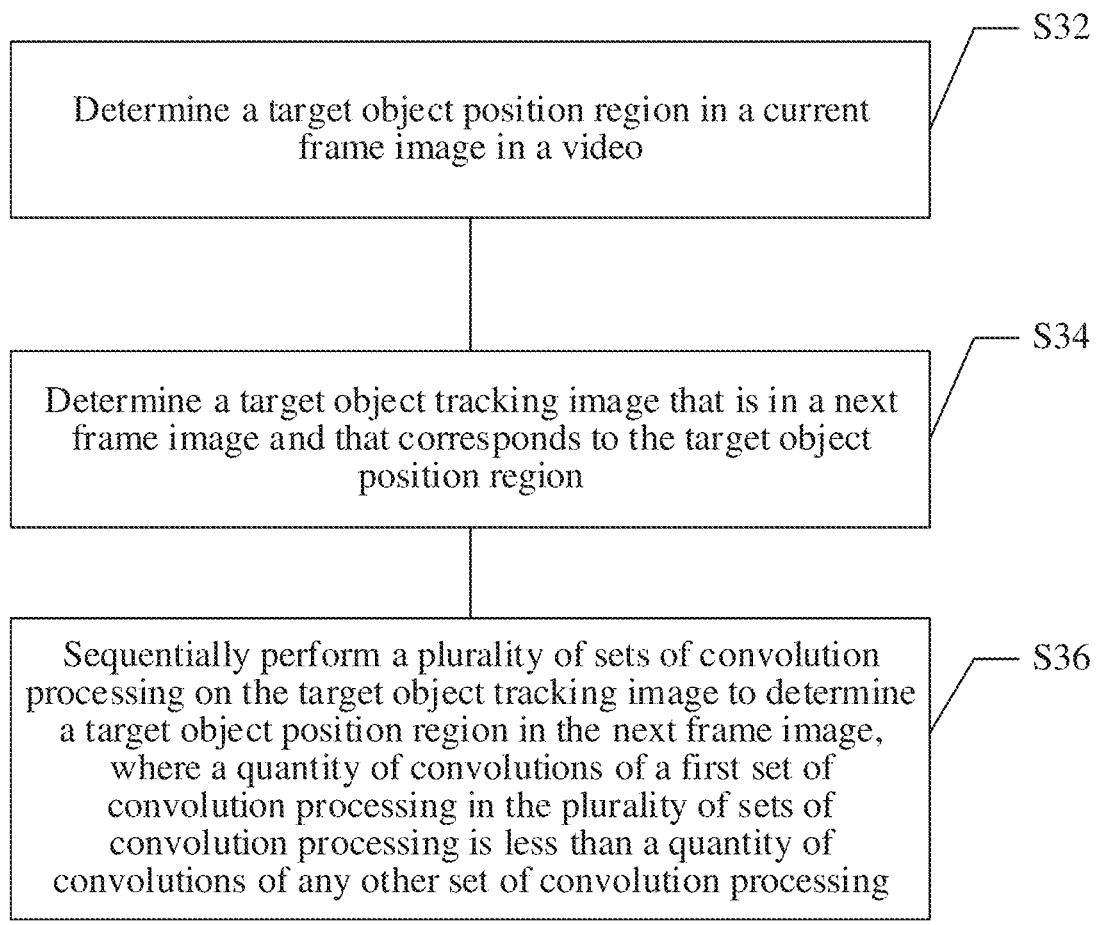
FIG. 3 is a schematic flowchart of a video image processing method according to an exemplary implementation of this application.

FIG. 3 is a schematic flowchart of a video image processing method according to an exemplary implementation of this application. As shown in FIG. 3, the video image processing method may include the following steps:

S32. Determine a target object position region in a current frame image in a video. In another implementation, step S32 may include determining a target-object region in a current frame in the video.

In an exemplary implementation of this application, a target object may include, but is not limited to, a human face, a gesture, a car, a tree or the like in an image. It is to be understood that any element in a video image may be used as a target object described in this application. In addition, the target-object region may be determined and represented by a width W, a height H and a specific position (x, y) of the target object in the image.

In some embodiments of this application, the current frame may refer to the first frame of video images, that is, a target-object region in the first frame of an original video is detected in step S32.

In other embodiments of this application, the current frame may refer to an image in which a target object is re-detected when an exception possibly occurs during video image processing. The exception described herein may include that a target object is not detected in the image, and may further include that a target object is not detected in a target object tracking solution described below.

It is to be understood that there is only one process of detecting a target-object region in this application in a case that an entire video image processing process is normal, and then a position of the target object in the image is determined based on the following tracking solution.

Specifically, the target-object region may be determined by using a detection neural network. The detection neural network may include a basic neural network and an output neural network. A process of detecting the target-object region in the image in the exemplary implementation of this application is described below. In addition, the description is made by using an example in which the detection process is performed by a server. However, it is to be understood that a detection process performed by a terminal device such as a mobile phone also belongs to concepts of this application.

The server may input a feature map of an image into the basic neural network for processing. The basic neural network may include a plurality of stacked convolution processing modules. A processing process of each convolution processing module includes: first, performing 1×1 dimensionality reduction convolution processing on the inputted feature map to obtain a first feature map; and then performing 1×1 dilated convolution processing on the first feature map to obtain a second feature map; in addition, performing depthwise separable convolution processing on the first feature map to obtain a third feature map; and subsequently, splicing the second feature map and the third feature map to obtain a feature map outputted by the convolution processing module.

A specific processing process of the depthwise separable convolution may include: performing 3×3 convolution processing on each dimension of the first feature map respectively to obtain an intermediate feature map having the same dimensionality as the first feature map; and then performing 1×1 convolution processing on the intermediate feature map to obtain the third feature map.

In addition, before the 1×1 convolution processing is performed on the intermediate feature map, batch normalization processing and linear rectification processing may be sequentially performed on the intermediate feature map. After the 1×1 convolution processing is performed on the intermediate feature map, batch normalization processing and linear rectification processing may be sequentially performed on the intermediate feature map on which the 1×1 convolution processing has been performed, to obtain the third feature map.

In addition, before the feature map is inputted into a predetermined convolution processing module in a plurality of stacked convolution processing modules, max pooling processing may be performed on the feature map. The predetermined convolution processing module is related to an actual detection scene. That is, in different detection scenes, positions and quantities of the preset convolution processing modules in the plurality of stacked convolution processing modules may be different, and the preset convolution processing module may be configured by a developer, which is not particularly limited in this exemplary implementation.

The max pooling processing has the following functions: on the one hand, it can achieve the effect of dimensionality reduction, to facilitate the subsequent convolution process; on the other hand, it can ensure invariance of features to make the detection process more robust. This application does not specifically limit the process of max pooling processing. In addition, for example, a step length of the max pooling processing may be set to 2.

It is to be understood that the foregoing terms "first", "second", "third", and "intermediate" are only for a distinguishing purpose, but are not to be interpreted as a limitation on the content of this application.

Figure 4:
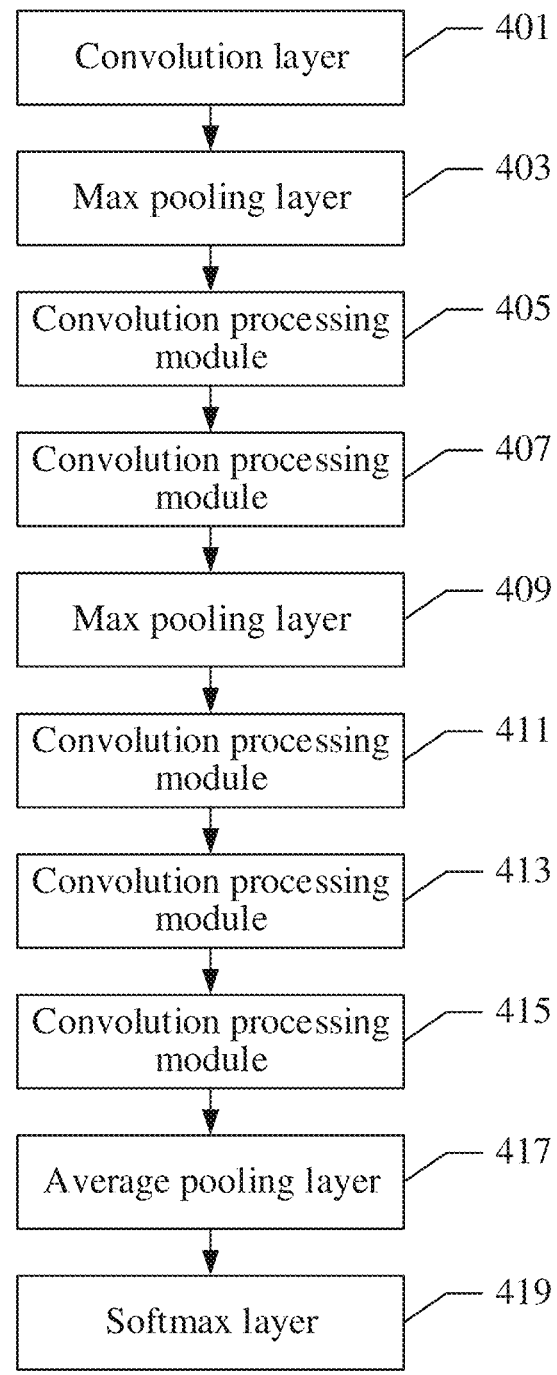
FIG. 4 is a schematic structural diagram of a basic neural network according to an exemplary implementation of this application.

FIG. 4 is a schematic diagram of a network structure of a basic neural network according to this application. Specifically, the exemplary network structure may include a convolution layer 401, max pooling layers 403 and 409, convolution processing modules 405, 407, 411, 413, and 415, an average pooling layer 417, and a softmax layer 419. It is to be understood that the structure shown in FIG. 4 is only an exemplary description, and other convolution layers may further be included in the network. In addition, locations and quantities of the convolution processing modules and the max pooling layers also change according to actual different application scenes.

Figure 5:
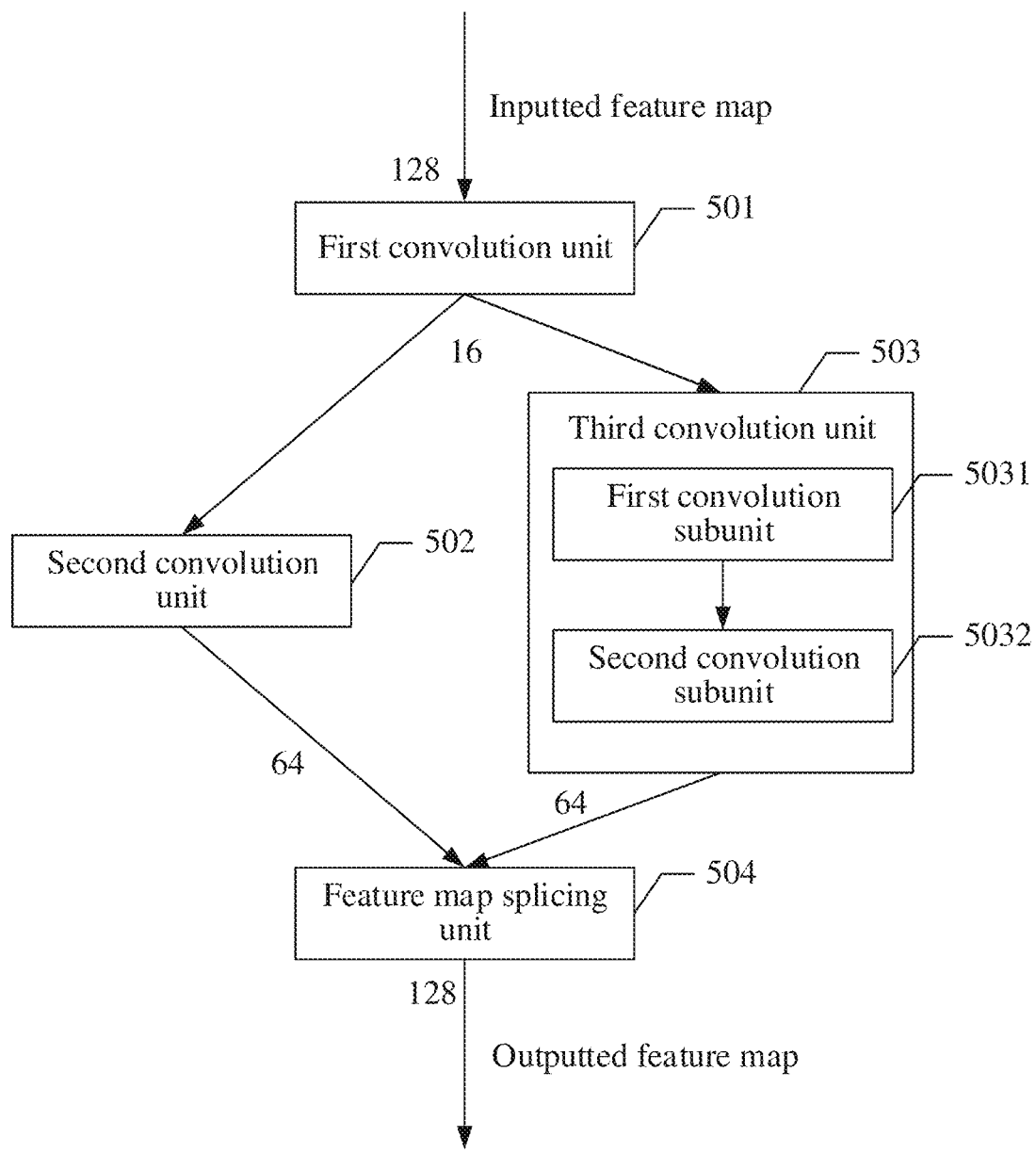
FIG. 5 is a schematic structural diagram of a convolution processing module according to an exemplary implementation of this application.

The structure of the convolution processing module is illustrated below with reference to FIG. 5.

A dimensionality of an inputted feature map may be 128, that is, 128 feature maps are inputted into the convolution processing module. First, the inputted feature map may be processed by a first convolution unit 501 to generate a feature map having a dimensionality of 16, that is, a first feature map. Specifically, the first convolution unit 501 may perform 1×1 dimensionality reduction convolution processing with a dimensionality of 16. A value corresponding to the 1×1 convolution kernel may vary according to an actual detection requirement. Next, on the one hand, the first feature map may be processed by a second convolution unit 502 to generate a feature map having a dimensionality of 64, that is, a second feature map. Specifically, the second convolution unit 502 may perform 1×1 dilated convolution processing with a dimensionality of 64; on the other hand, the first feature map may be processed by a third convolution unit 503 to generate a feature map having a dimensionality of 64, that is, a third feature map. Subsequently, the second feature map generated after the convolution by the second convolution unit 502 and the third feature map generated after the convolution by the third convolution unit 503 may be inputted to a feature map splicing unit 504. The feature map splicing unit 504 may splice the second feature map and the third feature map based on the dimensionality to obtain a feature map having a dimensionality of 128, that is, a feature map outputted by the convolution processing module.

The third convolution unit 503 may further include a first convolution subunit 5031 and a second convolution subunit 5032. Specifically, the first convolution subunit 5031 may respectively perform 3×3 convolution processing on each dimension of the first feature map to obtain an intermediate feature map having the same dimensionality as the first feature map; and the second convolution subunit 5032 may perform 1×1 convolution processing on the intermediate feature map to obtain the third feature map.

In addition, between the first convolution subunit 5031 and the second convolution subunit 5032, the third convolution unit 503 may further include a batch normalization unit and a linear rectification unit. Specifically, the batch normalization unit may be a batch normalization (BN) layer used for increasing a speed of network learning, and the linear rectification unit may be a rectified linear unit (ReLU) used for increasing sparsity of a network and increasing a training speed.

In addition, after the second convolution subunit 5032, the third convolution unit 503 may further include a batch normalization unit and a linear rectification unit.

Figure 6:
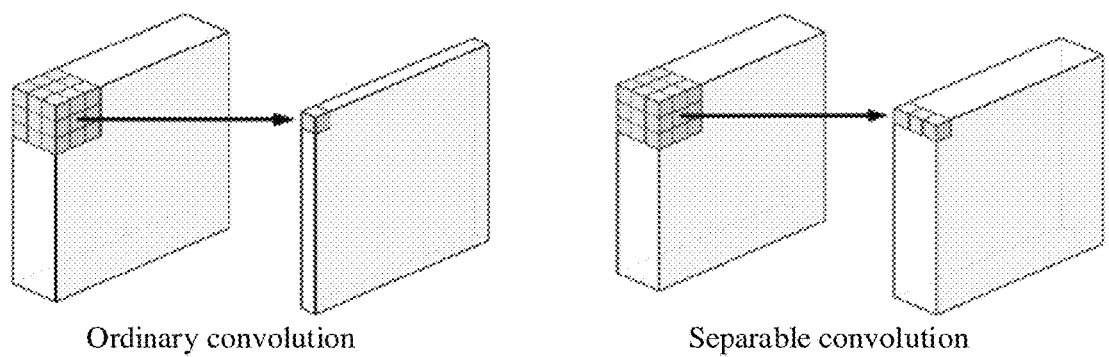
FIG. 6 is a schematic comparison diagram between separable convolution processing and ordinary convolution processing according to an exemplary implementation of this application.

The first convolution subunit 5031 performs a depthwise convolution process. FIG. 6 is a schematic diagram of a comparison between convolution effects of a 3×3 ordinary convolution and a 3×3 depthwise convolution.

For the ordinary convolution, in a case that a size of a convolution kernel is $D_K \cdot D_K$, the quantity of inputted feature maps is M, the quantity of outputted feature maps is N, and a size of the outputted feature map is $D_F \cdot D_F$, computational complexity may be expressed as: $D_K \cdot D_K \cdot M \cdot N \cdot D_F \cdot D_F$.

For the depthwise convolution, computational complexity may only be: $D_K \cdot D_K \cdot M \cdot D_F \cdot D_F$. With N 1×1 convolutions, total computational complexity of a depthwise separable convolution (that is, a process performed by the first convolution subunit 5031) may be expressed as:

$$D_K \cdot D_K \cdot M \cdot D_F \cdot D_F + M \cdot N \cdot D_F \cdot D_F$$

It can be seen that a ratio of the computational complexity of the depthwise separable convolution to the computational complexity of the ordinary convolution is:

$$\frac{D_K \cdot D_K \cdot M \cdot D_F \cdot D_F + M \cdot N \cdot D_F \cdot D_F}{D_K \cdot D_K \cdot M \cdot N \cdot D_F \cdot D_F} = \frac{1}{N} + \frac{1}{D_K^2}$$

For a 3×3 convolution kernel, the computational complexity of the depthwise separable convolution is only 1/9 to 1/8 of that of the ordinary convolution. Therefore, the depthwise separable convolution can effectively increase a detection speed.

Figure 7:
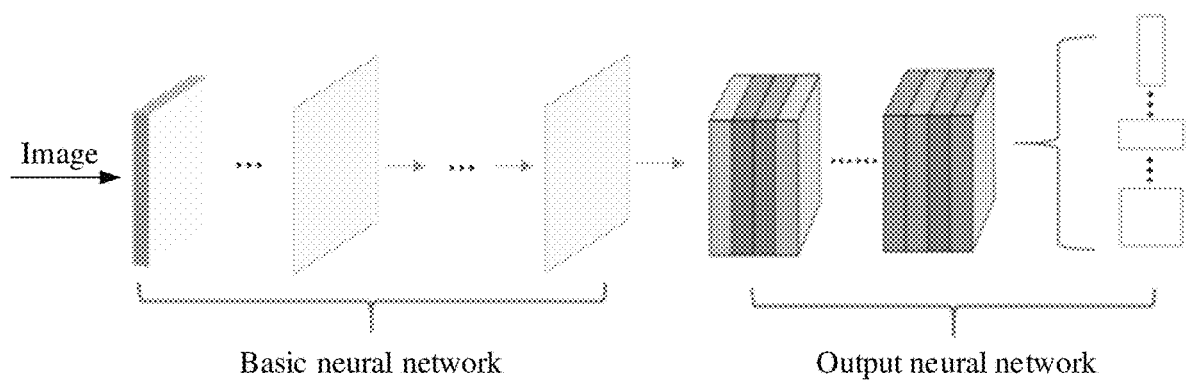
FIG. 7 is a schematic diagram of a model of a detection neural network according to an exemplary implementation of this application.

Referring to FIG. 7, a convolutional neural network involved in the image processing method of this application may include an output neural network in addition to the basic neural network. Specifically, the image processing method may further include: transmitting, to the output neural network, a feature map outputted by the basic neural network. The output neural network may be used for determining, by using a preset candidate region prediction method, a position of a target object according to the feature map outputted by the basic neural network. In another implementation, the preset candidate region may include a preset candidate anchor.

Figure 8:
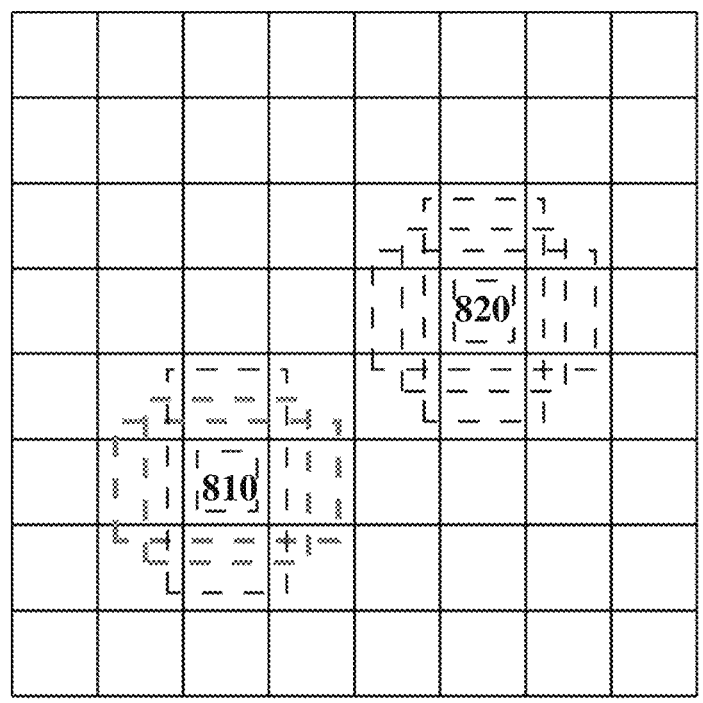
FIG. 8 is a schematic diagram of candidate regions according to an exemplary implementation of this application.

Specifically, a coordinate position of the target object may be predicted by using candidate regions (anchors). In addition, the candidate regions may be construed as predefined position coordinates (reference boxes) on the feature map. Referring to dotted lines in FIG. 8, such preset position coordinates (810 and 820) may be used as initial position coordinates of the target object. Next, the position of the target object may be accurately determined through network learning. In addition, the quantity of candidate regions corresponding to each pixel on the feature map may be set by a developer. For example but not limited to, the quantity of candidate regions corresponding to each pixel is 9.

According to some embodiments of this application, the video image processing method of this application may further include a process of adjusting network parameters. Details are as follows:

First, a loss function of the convolutional neural network composed of the basic neural network and the output neural network may be calculated; and then, a convolutional neural network parameter that minimizes the loss function may be determined; and next, the convolutional neural network parameter that minimizes the loss function may be applied to the convolutional neural network to implement a process of network weight adjustment.

In the exemplary description of this application, a process of calculating the loss function may include: first, respectively calculating a classification loss function $L_{conf}$ and a position loss function $L_{loc}$. In an embodiment, the position loss function $L_{loc}$ may be calculated according to Equation 1:

$$L_{loc} = \frac{1}{N} \sum_{i=1}^{W} \sum_{j=1}^{H} \sum_{k=1}^{K} I_{ijk} \left[ (\delta x_{ijk} - \delta x_{ijk}^G)^2 + (\delta y_{ijk} - \delta y_{ijk}^G)^2 + \right.$$

(Equation 1)

-continued
$$\left. (\delta w_{ijk} - \delta w_{ijk}^G)^2 + (\delta h_{ijk} - \delta h_{ijk}^G)^2 \right]$$

H and W are a height and a width of a feature map respectively; K is a total quantity of candidate regions; $I_{ijk}$ is a detection evaluation parameter; when an Intersection Over Union (IOU), which is a detection evaluation function) between a $k^{th}$ candidate region at a position (i,j) and a real region is greater than a preset threshold (for example, 0.7), $I_{ijk}$ is 1; otherwise $I_{ijk}$ is 0; $\delta x_{ijk}$, $\delta y_{ijk}$, $\delta w_{ijk}$, and $\delta h_{ijk}$ are coordinate offsets, which are outputted by the convolutional neural network, relative to the candidate regions respectively; and $\delta x_{ijk}^G$, $\delta y_{ijk}^G$, $\delta w_{ijk}^G$, and $\delta h_{ijk}^G$ are offsets of a real region of a target object relative to the candidate regions respectively.

In addition, the classification loss function $L_{conf}$ may be calculated according to Equation 2:

$$L_{conf} = \frac{1}{N} \sum_{i=1}^{W} \sum_{j=1}^{H} \sum_{k=1}^{K} \sum_{c=1}^{C} I_{ijk} y_c^G \log(p_c)$$

(Equation 2)

H and W are a height and a width of a feature map respectively, K is a total quantity of candidate regions, C is a category to which a target object belongs, $I_{ijk}$ is a detection evaluation parameter, $y_c^G$ characterizes a distribution of real regions of the target object, and $p_c$ is a probability of the category to which the target object belongs.

In addition, the quantity N of the regions where the target object matching the candidate region is located may be determined.

Next, a result obtained by dividing a sum of the classification loss function $L_{conf}$ and the position loss function $L_{loc}$ by the quantity N may be used as a loss function L of the convolutional neural network. Specifically, refer to Equation 3:

$$L = \frac{1}{N}(L_{conf} + L_{loc})$$

(Equation 3)

According to some other embodiments, after positions of the target object are determined, a detection result with a confidence higher than a predetermined confidence may be determined as coordinates of the target object. Herein, after network learning, not only the position of the target object but also a probability that the position of the target object includes the target object, that is, a confidence, is outputted. When the confidence is higher than the predetermined confidence, the position of the target object corresponding to the confidence is determined as coordinates of the target object. This is not specifically limited in this exemplary implementation.

After testing, by using the foregoing convolutional neural network for implementing the image processing method, on the one hand, a good effect of detecting a target object can be achieved; on the other hand, the convolutional neural network model is relatively small (about 1.8 MB), and a detection speed is fast (a speed on PC can reach 60 ms/frame). In this way, the requirement of detecting a target object such as a human face, a gesture, a pedestrian, a vehicle, or the like can be met.

S34. Determine a target object tracking image that is in a next frame image and that corresponds to the target object position region. In another implementation, step S34 may include determining a target-object tracking image in a next frame of the video and corresponding to the target-object region.

After the target-object region in the current frame is determined in step S32, the region may be used for obtaining a target-object tracking image in a next frame. Specifically, in a case that the position region is represented in a form of a rectangular frame, the target-object region in the current frame may be denoted by (x, y, w, h), where x and y represent coordinates of a center point (or any specified point, for example, upper left point, upper right point, lower left point, or lower right point) of the position region in the current frame respectively, and w and h represent a width and a height corresponding to the position region respectively. In other implementations, in addition to the rectangular frame, the position region may be characterized in other representation manners or shapes, for example, an elliptical position frame or a round position frame.

First, because a displacement of the target object is generally small within a time of one frame, the target-object region of the current frame may be magnified by a predetermined magnification to obtain a target-object tracking region. In one implementation, the predetermined magnification may be 1.5 to 2, and the target-object region may be magnified by the predetermined magnification based on the center point of the rectangular frame. In this case, the target-object tracking region may be denoted by (x', y', w', h').

Next, a portion of an image corresponding to the target-object tracking region in the next frame may be determined as the target-object tracking image.

S36. Sequentially perform a plurality of sets of convolution processing on the target-object tracking image to determine a target-object region in the next frame. A quantity of convolutions of a first set of convolution processing in the plurality of sets of convolution processing may be less than a quantity of convolutions of any other set of convolution processing. In one implementation, optionally and/or alternatively, a quantity of dimensionality of a convolution layer in a first set of convolution processing may be less than a quantity of dimensionality of a convolution layer of any other set of convolution processing. In another implementation, optionally and/or alternatively, a quantity of convolution layers in a first set of convolution processing may be less than a quantity of convolution layers of any other set of convolution processing.

According to some embodiments of this application, a plurality of sets of convolution processing may be performed on the target-object tracking image by using a tracking neural network. The tracking neural network may include a plurality of stacked convolution blocks, each convolution block may include a convolution layer and a max pooling layer, and each convolution block correspondingly performs one set of convolution processing. In such a case, the quantity of convolution layers of the first convolution block in the plurality of stacked convolution blocks is less than the quantity of convolution layers of any other convolution block.

Before the target object tracking image determined in step S34 is inputted into the tracking neural network, an image resolution suitable for a network input (for example, 72×72, 100×100) may be determined according to requirements of a network training structure. A server may determine whether a resolution of the target object tracking image matches the resolution required by the network input. In a case that the matching fails, the resolution of the target object tracking image may be adjusted to adapt the target object tracking image to the tracking neural network.

The tracking neural network of this application is illustrated below with reference to FIG. 9.

Figure 9:
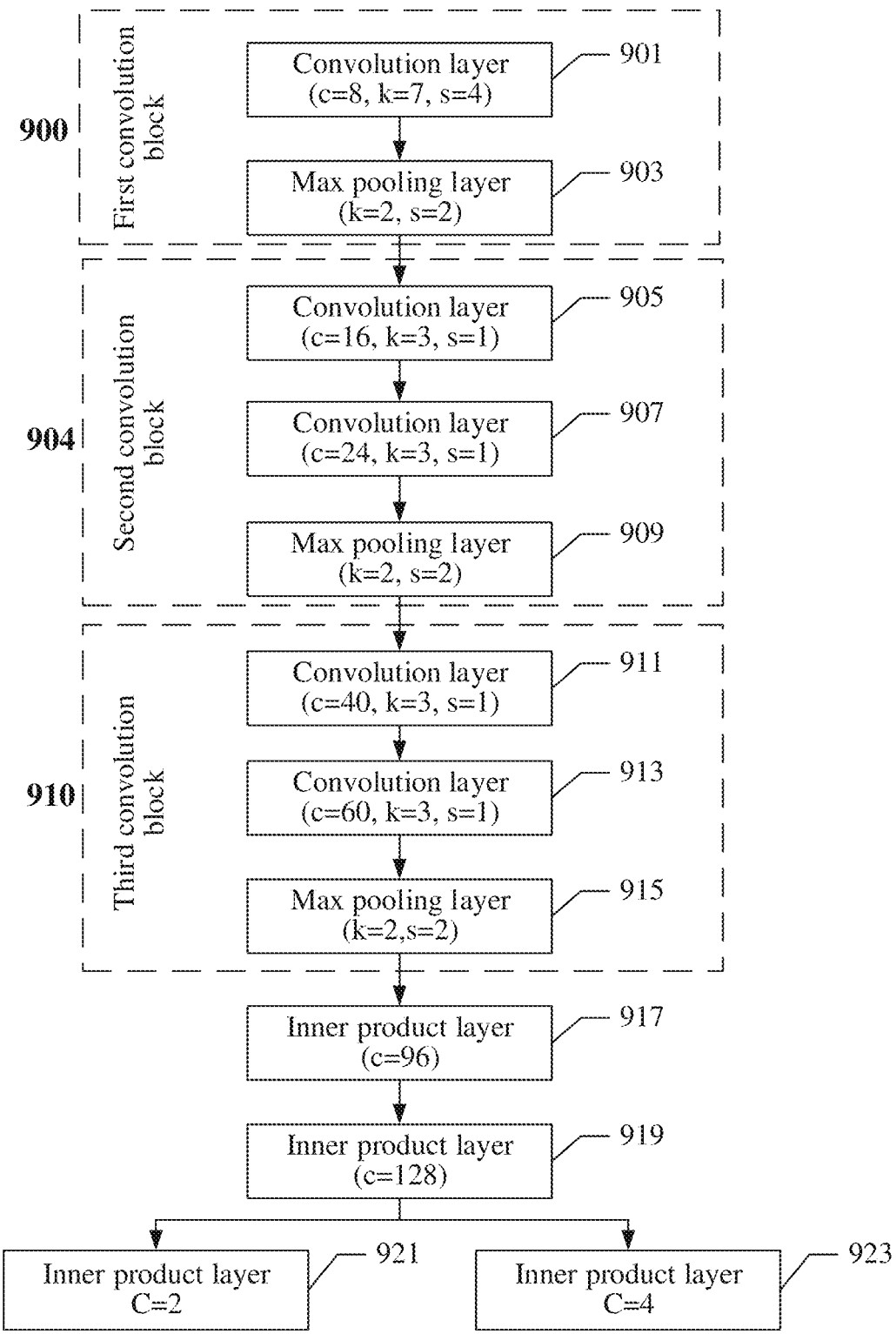
FIG. 9 is a schematic structural diagram of a tracking neural network according to an exemplary implementation of this application.

In the embodiment shown in FIG. 9, the tracking neural network may include a first convolution block 900, a second convolution block 904, and a third convolution block 910. In another implementation, according to different actual video image tracking scenes, the tracking neural network may further include other convolution blocks. The first convolution block 900 may include one convolution layer, and the second convolution block 904 and the third convolution block 910 may each include two convolution layers.

The first convolution block 900 may include a convolution layer 901 and a max pooling layer 903. The convolution layer includes 8 (c=8 in the figure) convolution kernels having a size of 7×7 (k=7 in the figure) and a step length of 4 (s=4 in the figure), and the max pooling layer 903 has a size of 2×2 and a step length of 4.

The convolution layers in the second convolution block 904 include a convolution layer 905 composed of 16 convolution kernels having a size of 3×3 and a step length of 1 and a convolution layer 907 composed of 24 kernels having a size of 3×3 and a step length of 1. The convolution layers in the third convolution block 910 include a convolution layer 911 composed of 40 convolution kernels having a size of 3×3 and a step length of 1 and a convolution layer 913 composed of 60 convolution kernels having a size of 3×3 and a step length of 1. In addition, a max pooling layer 909 and a max pooling layer 915 are the same as the max pooling layer 903.

Based on the convolution configuration shown in FIG. 9, on the one hand, in the first convolution block, a dimensionality of the convolution layer 901 is set to 8, and the value is relatively small, which helps improve an overall network calculation speed. In addition, by configuring the convolution kernels of the convolution layer 901 to have a size of 7×7 and a step length of 4, more features may be extracted at the beginning of the network without consuming a large quantity of computing resources. On the other hand, the second convolution block and the third convolution block are set by using the structure and parameters described above, so that the model is small and the calculation speed is fast while the target object is tracked.

In addition, it is to be understood that on the one hand, for some complex target objects to be tracked, that is, when the target objects correspond many features, a fourth convolution block, a fifth convolution block, and the like may be configured in the tracking neural network. It is to be understood that structures of newly configured convolution blocks are similar to the structures of the second convolution block and the third convolution block. On the other hand, for some simple target objects to be tracked, that is, when the target objects corresponds to few features, the dimensionality and the size of each convolution layer in the convolutional neural network shown in FIG. 9 may be appropriately decreased, and a structure adapts to the structure shown in FIG. 9. These all belong to the concepts of this application.

In addition to the convolution blocks, still referring to FIG. 9, the tracking neural network described in this application may further include an inner product layer 917 having a dimensionality of 96 and an inner product layer 919 having a dimensionality of 128 that are configured between the third convolution block and an output of the tracking neural network. It is easy for a person skilled in the art to understand that the inner product layer herein has a full connectivity function, and such a configuration of twice-full-connectivity contributes to increasing an overall network calculation speed.

The tracking neural network of this application has two output branches, that is, an inner product layer 921 and an inner product layer 923 in FIG. 9.

A result of an output branch represented by C=2 is to determine a confidence that a target object tracking image includes a target object, that is, a probability. A range of the confidence is [0, 1]. An outputted confidence may be compared with a preset threshold (for example, 0.9) in this application. In a case that the outputted confidence is less than the preset threshold, there is no target object in the target tracking image. In this case, the target object may be detected in an entire next frame. The specific detection process has been described in detail in step S32, and is not repeated herein again. In one implementation, in response to the outputted confidence being less than the preset threshold, the target object may be detected in the entire next frame, not limited to a portion of the next frame. In another implementation, in response to the outputted confidence being less than the preset threshold, the target object may be detected in a second next frame corresponding to the next frame.

In response to the confidence being greater than or equal to the preset threshold, the target object may be successfully detected in the next frame.

The meaning of outputting a confidence by the tracking neural network is to avoid erroneous racking, so that the object target is adjusted to a correct position in time.

A result of an output branch represented by C=4 is a position region of the target object in the next frame. The position region may be characterized as (X1, Y1, W1, H1).

In addition, this application further provides a solution for calculating a loss of the C=2 output branch to optimize the tracking neural network. First, a first loss function may be calculated according to the confidence. Specifically, the first loss function Lconf' may be calculated according to Equation 4:

$$L'_{conf} = -\sum_{j=1}^{K} I\{y_G = j\} \log S_j \quad \text{(Equation 4)}$$

For $I\{y_G=j\}$ function, in a case that $y_G=j$ is true, the value is 1; otherwise, the value is 0; $\gamma_G$ represents true data of category calibration, and K is the quantity of neurons of a C=2 output branch of the output. In addition, $S_j$ represents that a $j^{th}$ neuron is normalized, which may be obtained by using Equation 5:

$$S_j = \frac{e^{\alpha_j}}{\sum_{j=1}^{K} e^{\alpha_j}} \quad \text{(Equation 5)}$$

$\alpha_j$ represents a $j^{th}$ value in an inner product vector.

Next, a tracking neural network parameter that minimizes the first loss function may be determined; and then the tracking neural network is adjusted according to the tracking neural network parameter that minimizes the first loss function.

In addition, this application further provides a solution for calculating a loss of the C=4 output branch to optimize the tracking neural network. First, a second loss function may be calculated according to a target-object region in a next frame. Specifically, the second loss function $L_{reg}$ may be calculated according to Equation 6:

$$L_{reg} = \sum_{i=1}^{p} \|\hat{z}_i - z_i\|_2^2 \quad \text{(Equation 6)}$$

$Z_i$ is four components of a target rectangular frame, which are x, y, w, and h coordinates (that is, p=4) respectively. $\hat{Z}_i$ represents a prediction output of a network model, and $Z_i$ represents calibrated true coordinates of a target.

Next, a tracking neural network parameter that minimizes the second loss function may be determined; and then the tracking neural network is adjusted according to the tracking neural network parameter that minimizes the second loss function.

A solution of adjusting the tracking neural network parameter by using the first loss function and the second loss function in combination also belongs to the concepts of this application.

Through testing, a model size of the foregoing tracking neural network is less than 1 MB, so that such a model may be applied to a mobile phone and has good real-time tracking performance.

After the target-object region in the next frame is determined, the exemplary implementation of this application further includes: recognizing a target object in the target-object region in the next frame by using a deep residual network, to determine a category of the target object.

Figure 10:
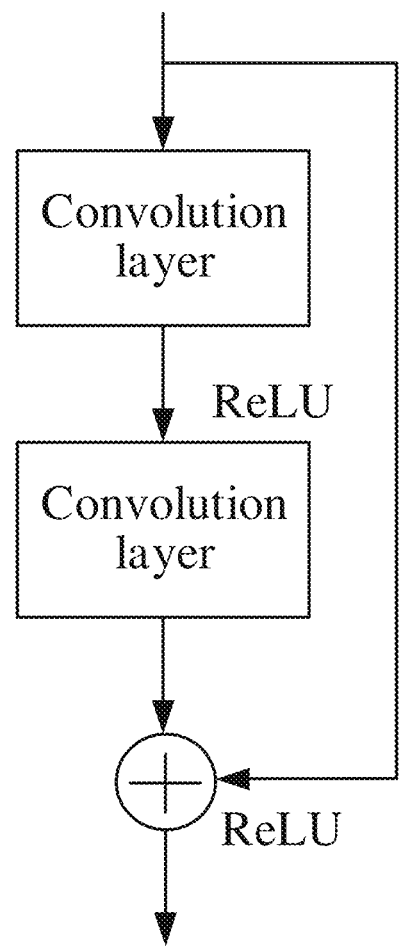
FIG. 10 is a schematic structural diagram of a deep residual network according to an exemplary implementation of this application.

Specifically, a basic structure of the deep residual network is shown in FIG. 10. The basic structure of the deep residual network used in this application may be similar to a basic structure of an existing residual network, which is not specifically described herein. In one implementation, there are some difference, for example, a deep residual network includes 18 layers and 3 convolution kernels are used in this application, while 10 convolution kernels are generally used in the related art. Therefore, while recognition accuracy is slightly decreased, a recognition speed is greatly increased and the model size is decreased. However, through testing, such a result with slightly decreased recognition accuracy does not cause any impact on the category of the recognized target object, and performance of the entire network is greatly improved.

Figure 11:
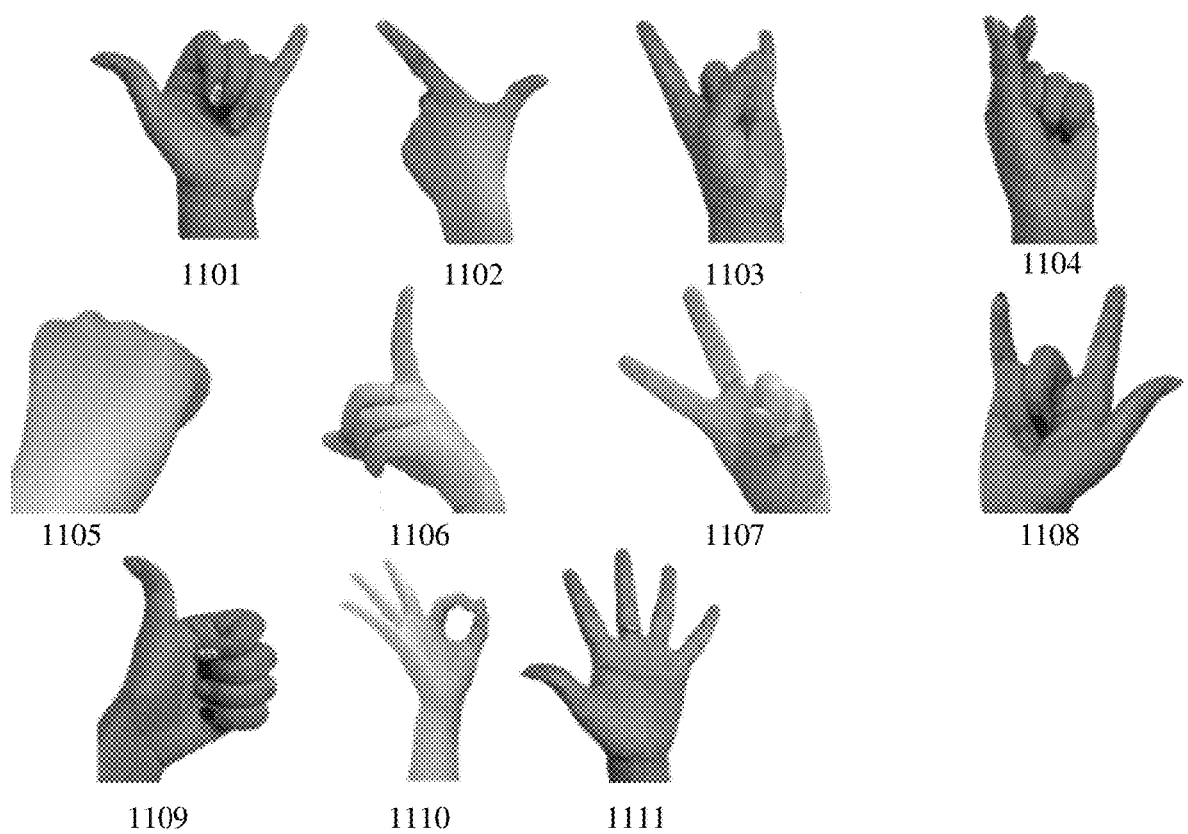
FIG. 11 is a schematic diagram of examples of gesture categories in an example of gesture recognition according to this application.

Taking gesture recognition as an example, referring to FIG. 11, the foregoing recognition method can achieve accurate recognition of a gesture 1101 to a gesture 1111 in FIG. 11 may be achieved. However, gestures are not limited to the foregoing gestures, and may also include other categories.

Figure 12:
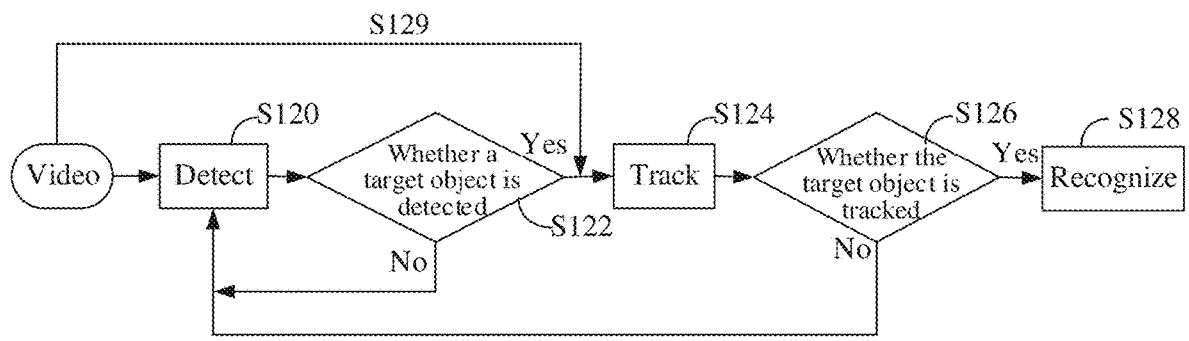
FIG. 12 is a logical schematic diagram of an entire process of a video image processing method according to an exemplary implementation of this application.

Referring to FIG. 12 below, an entire process of the video image processing method of this application is described.

In step 120, a target object in a video image may be detected to determine a target-object region. For the specific detection process, refer to step S32. In step S122, it may be determined whether the target object is detected; in a case that the target object is detected, step S124 is performed; in a case that the target object is not detected, step S120 is performed again to detect a next frame of the video image. In step S124, the target object may be tracked in real time, and specifically, real-time tracking may be implemented by using the tracking neural network in step S36. In step S126, it may be determined whether the target object is tracked; in a case that the target object is tracked, a target object recognition process of step S128 may be performed; in a case that the target object is not tracked, step S120 is performed again to detect a target object in an entire image that is currently tracked. In addition, position information of the target object may be further marked in a video in advance. In such a case, the target object may be directly tracked in real time (e.g, S129).

In the embodiment described in FIG. 12, when the target object is tracked, a recognition process is performed. However, considering load and a heating problem of a mobile phone, although the target object is tracked in every frame, the recognition process may be performed at intervals of predetermined frames, for example, the recognition process is performed at intervals of 5 frames.

In summary, on the one hand, the video image processing method of this application uses a small model and has a fast processing speed, and may be directly applied to a terminal device such as a mobile phone. On the other hand, the video image processing method of this application may be applied to various fields such as human-computer interaction, intelligent monitoring, security check, data entertainment, digital cameras, or the like, thereby desirably achieving application purposes such as gesture recognition, face recognition, or vehicle detection. For example, in a scene such as a live broadcast or a video chat, after a gesture in the video is tracked and recognized, a gesture pendant such as a virtual bracelet or a special effect such as a color effect may be added to the hand.

Although the steps of the method in this application are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step for execution, and/or one step may be decomposed into a plurality of steps for execution, or the like.

Further, in an exemplary implementation, a video image processing apparatus is further provided.

Figure 13:
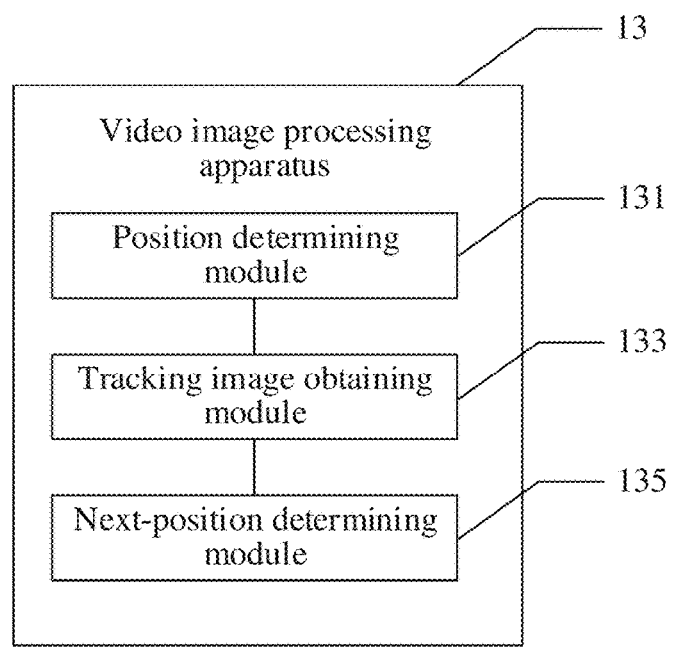
FIG. 13 is a schematic block diagram of a video image processing apparatus according to an exemplary implementation of this application.

FIG. 13 is a schematic block diagram of a video image processing apparatus according to an exemplary implementation of this application. Referring to FIG. 13, the video image processing apparatus 13 according to the exemplary implementation of this application may include a position determining module 131, a tracking image obtaining module 133 and a next-position determining module 135.

Specifically, the position determining module 131 may be configured to determine a target-object region in a current frame in a video; the tracking image obtaining module 133 may be configured to sequentially perform a plurality of sets of convolution processing on a target object tracking image to determine a target-object region in a next frame; and the next-position determining module 135 may be configured to sequentially perform a plurality of sets of convolution processing on the target object tracking image to determine the target-object region in the next frame, where a quantity of convolutions of a first set of convolution processing in the plurality of sets of convolution processing is less than a quantity of convolutions of any other set of convolution processing.

In the video image processing apparatus of this application, on the one hand, convolution processing is performed on the target object tracking image rather than the entire next frame, which greatly reduces the computational amount and increases the efficiency of target object tracking. On the other hand, the quantity of convolutions of the first set of convolution processing in the plurality of sets of convolution processing is less than the quantity of convolutions of any other set of convolution processing. In this way, the network structure model is relatively small and a processing speed is increased.

Figure 14:
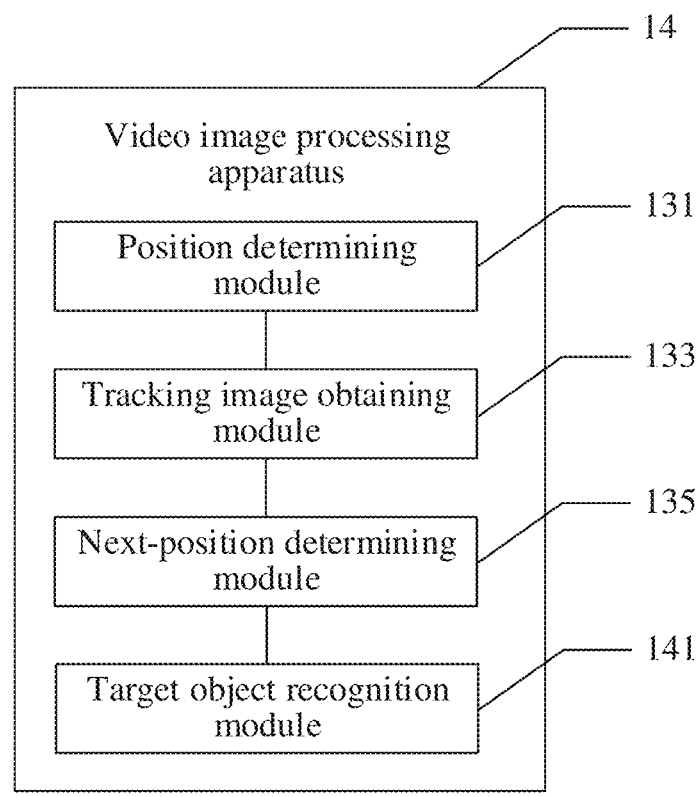
FIG. 14 is a schematic block diagram of a video image processing apparatus according to an exemplary implementation of this application.

According to an exemplary embodiment of this application, referring to FIG. 14, compared with the video image processing apparatus 13, a video image processing apparatus 14 may further include a target object recognition module 141 in addition to the position determining module 131, the tracking image obtaining module 133 and the next-position determining module 135.

Specifically, the target object recognition module 141 may be configured to recognize a target object in the target-object region in the next frame by using a deep residual network, to determine a category of the target object.

Figure 15:
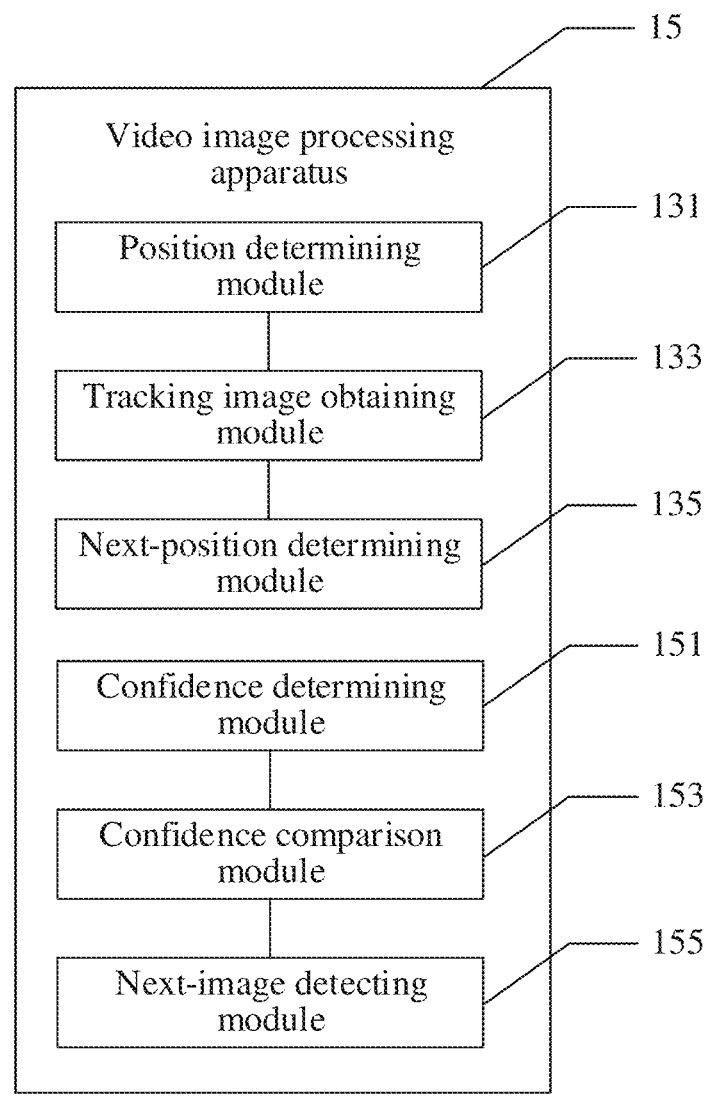
FIG. 15 is a schematic block diagram of a video image processing apparatus according to an exemplary implementation of this application.

According to an exemplary embodiment of this application, referring to FIG. 15, compared with the video image processing apparatus 13, a video image processing apparatus 15 may further include a confidence determining module 151, a confidence comparison module 153 and a next-image detecting module 155 in addition to the position determining module 131, the tracking image obtaining module 133 and the next-position determining module 135.

Specifically, the confidence determining module 151 may be configured to determine a confidence that the target-object region in the next frame includes a target object; the confidence comparison module 153 may be configured to compare the confidence with a preset threshold; the next-image detecting module 155 may be configured to detect the target object in the next frame in a case that the confidence is less than the preset threshold.

Figure 16:
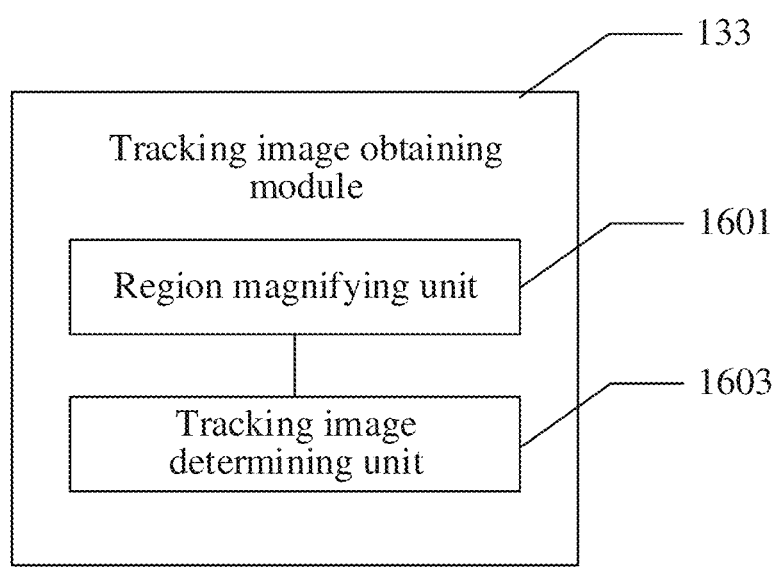
FIG. 16 is a schematic block diagram of a tracking image obtaining module according to an exemplary implementation of this application.

According to an exemplary embodiment of this application, referring to FIG. 16, the tracking image obtaining module 133 may include a region magnifying unit 1601 and a tracking image determining unit 1603.

Specifically, the region magnifying unit 1601 may be configured to magnify the target-object region in the current frame by a predetermined magnification to obtain a target object tracking region; the tracking image determining unit 1603 may be configured to determine an image that is in the next frame and that corresponds to the target object tracking region as the target object tracking image.

According to an exemplary embodiment of this application, the next-position determining module 135 may be further configured to sequentially perform a plurality of sets of convolution processing on the target object tracking image by using a tracking neural network, where the tracking neural network includes a plurality of stacked convolution blocks, each convolution block includes a convolution layer and a max pooling layer, and each convolution block performs a set of convolution processing.

According to an exemplary embodiment of this application, a first convolution block in the plurality of stacked convolution blocks includes one convolution layer, and other convolution blocks except the first convolution block each include two convolution layers. The convolution layer in the first convolution block includes eight convolution kernels having a size of 7×7 and a step length of 4. The convolution layers in a second convolution block include 16 convolution kernels having a size of 3×3 and a step length of 1 and 24 convolution kernels having a size of 3×3 and a step length of 1. The convolution layers in a third convolution block includes 40 convolution kernels having a size of 3×3 and a step length of 1 and 60 convolution kernels having a size of 3×3 and a step length of 1.

According to an exemplary embodiment of this application, the tracking neural network further includes an inner product layer having a dimensionality of 96 and an inner product layer having a dimensionality of 128 that are configured between the third convolution block and an output of the tracking neural network.

Figure 17:
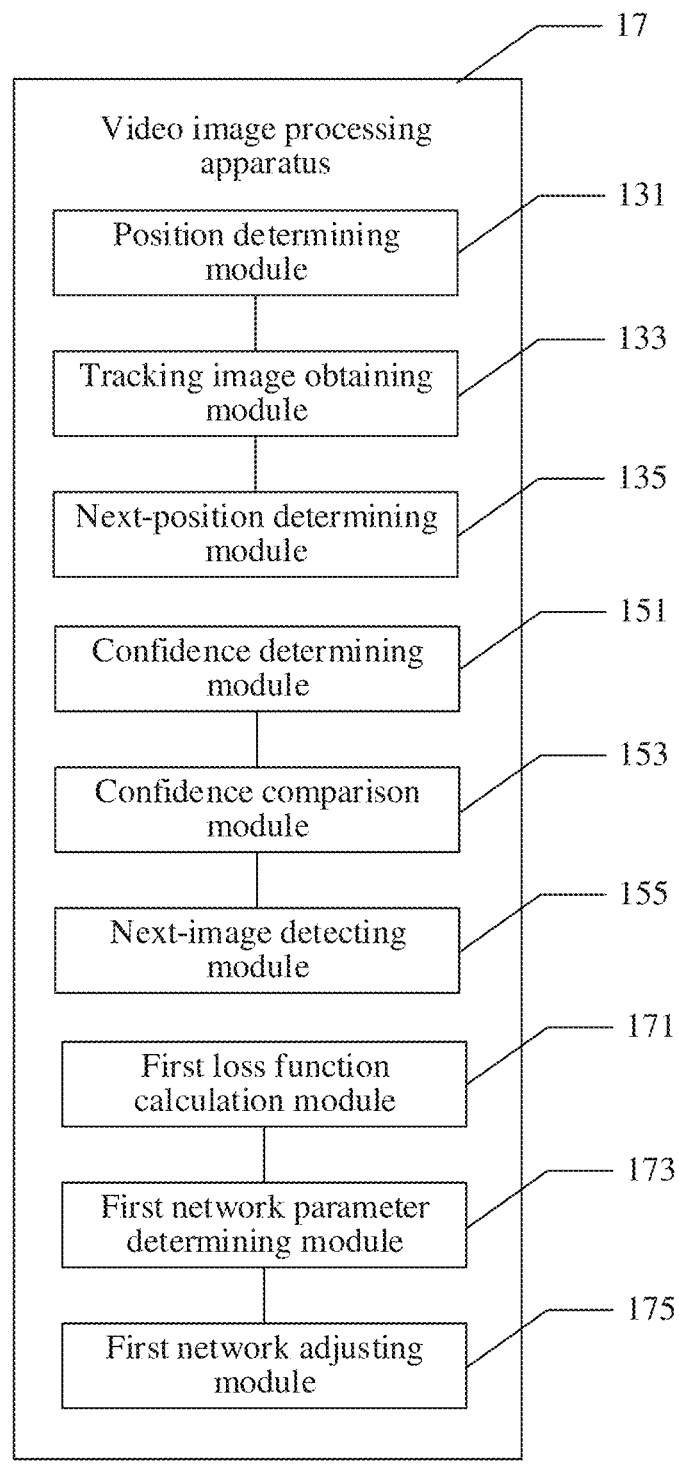
FIG. 17 is a schematic block diagram of a video image processing apparatus according to an exemplary implementation of this application.

According to an exemplary embodiment of this application, for determining a confidence that the target object tracking image includes the target object by using the tracking neural network, referring to FIG. 17, compared with the video image processing apparatus 15, a video image processing apparatus 17 may further include a first loss function calculation module 171, a first network parameter determining module 173 and a first network adjusting module 175 in addition to the position determining module 131, the tracking image obtaining module 133, the next-position determining module 135, the confidence determining module 151, the confidence comparison module 153 and the next-image detecting module 155.

Specifically, the first loss function calculation module 171 may be configured to calculate a first loss function according to the confidence; the first network parameter determining module 173 may be configured to determine a tracking neural network parameter that minimizes the first loss function; and the first network adjusting module 175 may be configured to adjust the tracking neural network according to the tracking neural network parameter that minimizes the first loss function.

Figure 18:
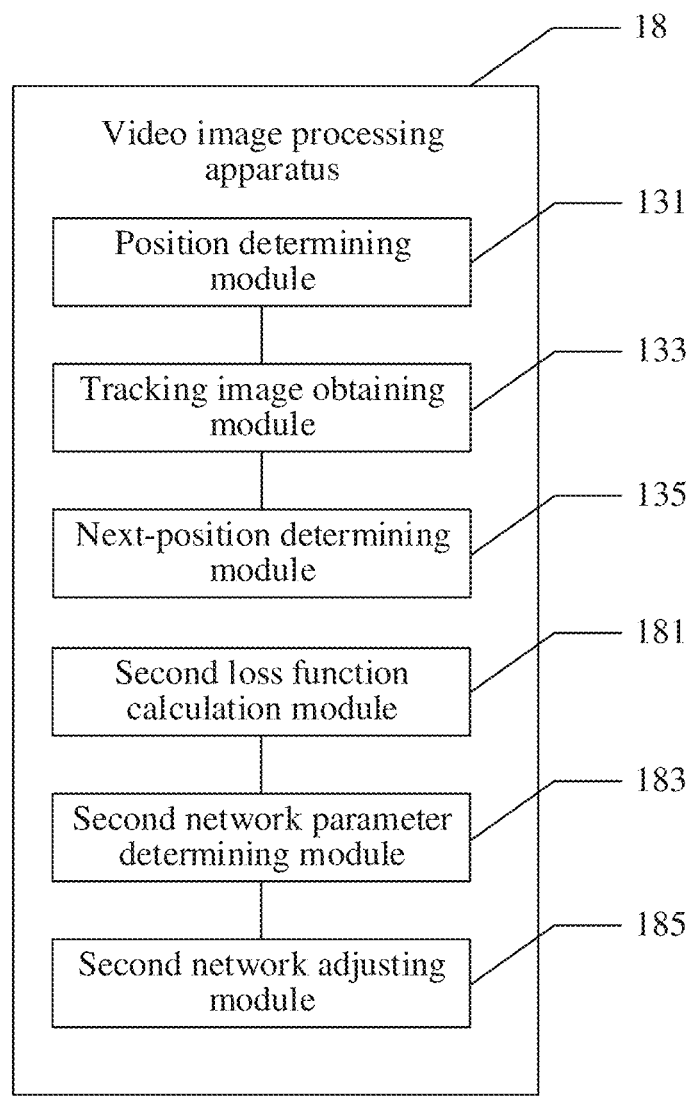
FIG. 18 is a schematic block diagram of a video image processing apparatus according to an exemplary implementation of this application.

According to an exemplary embodiment of this application, for determining the target-object region in the next frame by using the tracking neural network, referring to FIG. 18, compared with the video image processing apparatus 13, a video image processing apparatus 18 may further include a second loss function calculation module 181, a second network parameter determining module 183 and a second network adjusting module 185 in addition to the position determining module 131, the tracking image obtaining module 133 and the next-position determining module 135.

The second loss function calculation module 181 may be configured to calculate a second loss function according to the target-object region in the next frame; the second network parameter determining module 183 may be configured to determine a tracking neural network parameter that minimizes the second loss function; and the second network adjusting module 185 may be configured to adjust the tracking neural network according to the tracking neural network parameter that minimizes the second loss function.

It is to be understood that the second loss function calculation module 181, the second network parameter determining module 183 and the second network adjusting module 185 may further be included in the video image processing apparatus 17, so that the network parameters for adjustment are determined by combining the two loss function calculation results.

Figure 19:
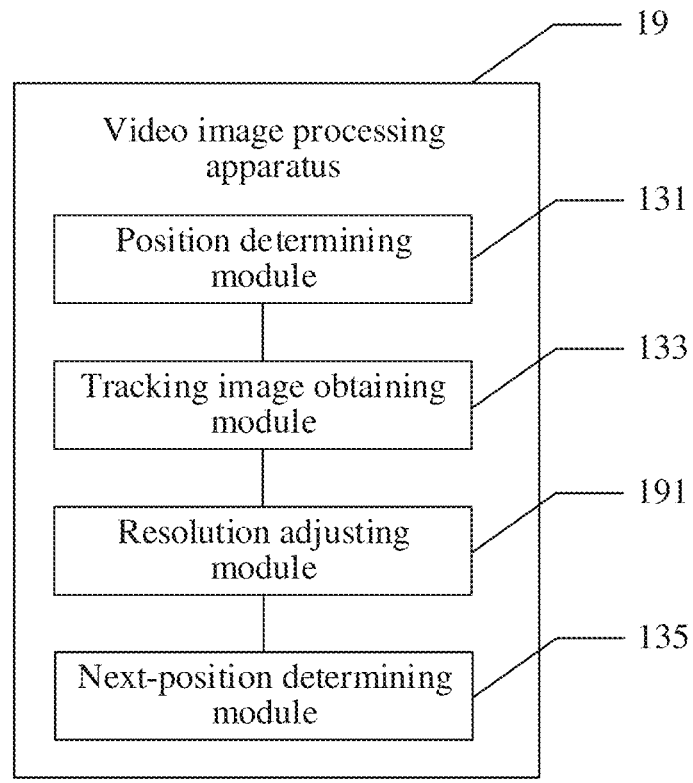
FIG. 19 is a schematic block diagram of a video image processing apparatus according to an exemplary implementation of this application.

According to an exemplary embodiment of this application, referring to FIG. 19, compared with the video image processing apparatus 13, a video image processing apparatus 19 may further include a resolution adjusting module 191 in addition to the position determining module 131, the tracking image obtaining module 133 and the next-position determining module 135.

Specifically, the resolution adjusting module 191 may be configured to, before a target object tracking image is inputted into a tracking neural network, adjust a resolution of the target object tracking image to adapt the target object tracking image to the tracking neural network.

Figure 20:
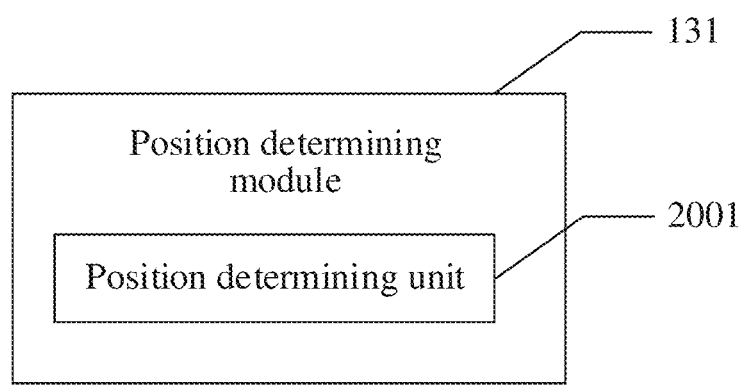
FIG. 20 is a schematic block diagram of a position determining module according to an exemplary implementation of this application.

According to an exemplary embodiment of this application, referring to FIG. 20, the position determining module 131 may include a position determining unit 2001.

Specifically, the position determining unit 2001 may be configured to input a feature map of the current frame into a basic neural network for processing to determine the target-object region in the current frame. The basic neural network may include a plurality of stacked convolution processing modules, and each convolution processing module performs the following processing on the inputted feature map: performing 1×1 dimensionality reduction convolution processing on the inputted feature map to obtain a first feature map; performing 1×1 dilated convolution processing on the first feature map to obtain a second feature map; performing depthwise separable convolution processing on the first feature map to obtain a third feature map; and splicing the second feature map and the third feature map to obtain a feature map outputted by the convolution processing module.

According to an exemplary embodiment of this application, the performing depthwise separable convolution processing on the first feature map to obtain a third feature map includes: performing 3×3 convolution processing on each dimension of the first feature map to obtain an intermediate feature map having the same dimensionality as the first feature map; and performing 1×1 convolution processing on the intermediate feature map to obtain the third feature map.

Because the functional modules of the video image processing apparatus in this implementation of this application are the same as those in the foregoing method embodiment, details are not described herein again.

In addition, the foregoing accompanying drawings are only schematic illustrations of the processing included in the method according to the exemplary embodiments of this application, and are not intended for limitation. It is easy to understand that the processing shown in the foregoing accompanying drawings does not indicate or limit a chronological order of such processing. In addition, it is also easy to understand that such processing may be, for example, synchronously performed or asynchronously performed in a plurality of modules.

Although several modules or units of the device for action execution are mentioned in the foregoing detailed description, such a division is not mandatory. In fact, the features and the functions of two or more modules or units described above may be embodied in one module or unit according to the implementations of this application. On the other hand, the features and the functions of one module or unit described above may be further divided into a plurality of modules or units to be embodied.

After considering the specification and implementing the present disclosure, a person skilled in the art can readily think of other embodiments of this application. This application is intended to cover any variations, uses or adaptations of this application that follow the general principles of this application and that include well-known knowledge and conventional technical means in the art not disclosed in this application. The specification and the embodiments are merely considered as examples, and the actual scope and the spirit of this application are stated in the claims.

It is to be understood that this application is not limited to the accurate structures that are described in the foregoing and that are shown in the accompanying drawings, and modifications and changes may be made without departing from the scope of this application. The scope of this application is limited only by the appended claims.

What is claimed is:

1. A method for processing images in a video, the method comprising:

determining, by a device comprising a memory storing instructions and a processor in communication with the memory, a target-object region in a current frame in a video;

determining, by the device, a target-object tracking image in a next frame and corresponding to the target-object region;

sequentially performing, by the device, a plurality of sets of convolution processing on the target-object tracking image to determine a target-object region in the next frame, a quantity of convolutions of a first set of convolution processing in the plurality of sets of convolution processing being less than a quantity of convolutions of any other set of convolution processing;

determining, by the device, a confidence that the target-object region in the next frame comprises a target object;

comparing, by the device, the confidence with a preset threshold;

in response to the confidence being less than the preset threshold, detecting, by the device, a target object in a second next frame corresponding to the next frame; and in response to the confidence not being less than the preset threshold, detecting, by the device, the target object in the next frame.

2. The method according to claim 1, further comprising:
recognizing, by the device, a second target object in the target-object region in the next frame by using a deep residual network, to determine a category of the second target object.

3. The method according to claim 1, wherein for determining the confidence that the target-object region in the next frame comprises the target object, the method further comprises:

calculating, by the device, a first loss function of a tracking neural network according to the confidence;

determining, by the device, a tracking neural network parameter that minimizes the first loss function; and adjusting, by the device, the tracking neural network according to the tracking neural network parameter that minimizes the first loss function.

4. The method according to claim 1, wherein the sequentially performing the plurality of sets of convolution processing on the target-object tracking image comprises:

sequentially performing, by the device, a plurality of sets of convolution processing on the target-object tracking image by using a tracking neural network, the tracking neural network comprising a plurality of stacked convolution blocks, each convolution block comprising a convolution layer and a max pooling layer, and each convolution block performing one set of convolution processing.

5. The method according to claim 4, wherein:
a first convolution block in the plurality of stacked convolution blocks comprises a convolution layer, and each other convolution block except the first convolution block comprises two convolution layers;

the convolution layer in the first convolution block comprises eight convolution kernels having a size of 7×7 and a step length of 4;

one of the two convolution layers in a second convolution block comprises 16 convolution kernels having a size of 3×3 and a step length of 1, and the other of the two convolution layers in the second convolution block comprises 24 convolution kernels having a size of 3×3 and a step length of 1; and one of the two convolution layers in a third convolution block comprises 40 convolution kernels having a size of 3×3 and a step length of 1, and the other of the two convolution layers in the third convolution block comprises 60 convolution kernels having a size of 3×3 and a step length of 1.

6. The method according to claim 1, wherein the determining the target-object region in the current frame in the video comprises:

inputting, by the device, a feature map of the current frame into a basic neural network for processing to determine the target-object region in the current frame, the basic neural network comprising a plurality of stacked convolution processing modules, and each convolution processing module performing the following processing on the inputted feature map:

performing 1×1 dimensionality reduction convolution processing on the inputted feature map to obtain a first feature map;

performing 1×1 dilated convolution processing on the first feature map to obtain a second feature map;

performing depthwise separable convolution processing on the first feature map to obtain a third feature map; and splicing the second feature map and the third feature map to obtain a feature map outputted by the convolution processing module.

7. An apparatus for processing images in a video, the apparatus comprising:

a memory storing instructions; and a processor in communication with the memory, wherein, when the processor executes the instructions, the processor is configured to cause the apparatus to:

determine a target-object region in a current frame in a video, determining a target-object tracking image in a next frame and corresponding to the target-object region, sequentially perform a plurality of sets of convolution processing on the target-object tracking image to determine a target-object region in the next frame, a quantity of convolutions of a first set of convolution processing in the plurality of sets of convolution processing being less than a quantity of convolutions of any other set of convolution processing, determine a confidence that the target-object region in the next frame comprises a target object, compare the confidence with a preset threshold, in response to the confidence being less than the preset threshold, detect a target object in a second next frame corresponding to the next frame, and in response to the confidence not being less than the preset threshold, detect a target object in the next frame.

8. The apparatus according to claim 7, wherein when the processor executes the instructions, the processor is configured to further cause the apparatus to:

recognize a second target object in the target-object region in the next frame by using a deep residual network, to determine a category of the second target object.

9. The apparatus according to claim 7, wherein, when the processor is configured to cause the apparatus to determine the confidence that the target-object region in the next frame comprises the target object, the processor is configured to further cause the apparatus to:

calculate a first loss function of a tracking neural network according to the confidence;

determine a tracking neural network parameter that minimizes the first loss function; and adjust the tracking neural network according to the tracking neural network parameter that minimizes the first loss function.

10. The apparatus according to claim 7, wherein, when the processor is configured to cause the apparatus to sequentially perform the plurality of sets of convolution processing on the target-object tracking image, the processor is configured to cause the apparatus to:

sequentially perform a plurality of sets of convolution processing on the target-object tracking image by using a tracking neural network, the tracking neural network comprising a plurality of stacked convolution blocks, each convolution block comprising a convolution layer and a max pooling layer, and each convolution block performing one set of convolution processing.

11. The apparatus according to claim 10, wherein:

a first convolution block in the plurality of stacked convolution blocks comprises a convolution layer, and each other convolution block except the first convolution block comprises two convolution layers;

the convolution layer in the first convolution block comprises eight convolution kernels having a size of 7×7 and a step length of 4;

one of the two convolution layers in a second convolution block comprises 16 convolution kernels having a size of 3×3 and a step length of 1, and the other of the two convolution layers in the second convolution block comprises 24 convolution kernels having a size of 3×3 and a step length of 1; and one of the two convolution layers in a third convolution block comprises 40 convolution kernels having a size of 3×3 and a step length of 1, and the other of the two convolution layers in the third convolution block comprises 60 convolution kernels having a size of 3×3 and a step length of 1.

12. The apparatus according to claim 7, wherein, when the processor is configured to cause the apparatus to determine the target-object region in the current frame in the video, the processor is configured to cause the apparatus to:

input a feature map of the current frame into a basic neural network for processing to determine the target-object region in the current frame, the basic neural network comprising a plurality of stacked convolution processing modules, and each convolution processing module performing the following processing on the inputted feature map:

performing 1×1 dimensionality reduction convolution processing on the inputted feature map to obtain a first feature map;

performing 1×1 dilated convolution processing on the first feature map to obtain a second feature map;

performing depthwise separable convolution processing on the first feature map to obtain a third feature map; and splicing the second feature map and the third feature map to obtain a feature map outputted by the convolution processing module.

13. A non-transitory computer readable storage medium storing computer readable instructions, wherein, the computer readable instructions, when executed by a processor, are configured to cause the processor to perform:

determining a target-object region in a current frame in a video;

determining a target-object tracking image in a next frame and corresponding to the target-object region;

sequentially performing a plurality of sets of convolution processing on the target-object tracking image to determine a target-object region in the next frame, a quantity of convolutions of a first set of convolution processing in the plurality of sets of convolution processing being less than a quantity of convolutions of any other set of convolution processing;

determining a confidence that the target-object region in the next frame comprises a target object;

comparing the confidence with a preset threshold;

in response to the confidence being less than the preset threshold, detecting a target object in a second next frame corresponding to the next frame; and in response to the confidence not being less than the preset threshold, detecting a target object in the next frame.

14. The non-transitory computer readable storage medium according to claim 13, wherein the computer readable instructions are configured to further cause the processor to perform:

recognizing a second target object in the target-object region in the next frame by using a deep residual network, to determine a category of the second target object.

15. The non-transitory computer readable storage medium according to claim 13, wherein when the computer readable instructions are configured to cause the processor to perform determining the confidence that the target-object region in the next frame comprises the target object, the computer readable instructions are configured to further cause the processor to perform:

calculating a first loss function of a tracking neural network according to the confidence;

determining a tracking neural network parameter that minimizes the first loss function; and adjusting the tracking neural network according to the tracking neural network parameter that minimizes the first loss function.

16. The non-transitory computer readable storage medium according to claim 13, wherein when the computer readable instructions are configured to cause the processor to sequentially perform the plurality of sets of convolution processing on the target-object tracking image, the computer readable instructions are configured to cause the processor to perform:

sequentially performing a plurality of sets of convolution processing on the target-object tracking image by using a tracking neural network, the tracking neural network comprising a plurality of stacked convolution blocks, each convolution block comprising a convolution layer and a max pooling layer, and each convolution block performing one set of convolution processing.

17. The non-transitory computer readable storage medium according to claim 16, wherein:

a first convolution block in the plurality of stacked convolution blocks comprises a convolution layer, and each other convolution block except the first convolution block comprises two convolution layers;

the convolution layer in the first convolution block comprises eight convolution kernels having a size of 7×7 and a step length of 4;

one of the two convolution layers in a second convolution block comprises 16 convolution kernels having a size of 3×3 and a step length of 1, and the other of the two convolution layers in the second convolution block comprises 24 convolution kernels having a size of 3×3 and a step length of 1; and one of the two convolution layers in a third convolution block comprises 40 convolution kernels having a size of 3×3 and a step length of 1, and the other of the two convolution layers in the third convolution block comprises 60 convolution kernels having a size of 3×3 and a step length of 1.

* * * * *